US006330010B1

(12) United States Patent
Nason et al.

(10) Patent No.: US 6,330,010 B1
(45) **Date of Patent: *Dec. 11, 2001**

(54) SECONDARY USER INTERFACE

(75) Inventors: David D Nason; Thomas C O'Rourke; Scott J Campbell, all of Seattle, WA (US)

(73) Assignee: xSides Corporation, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/191,322

(22) Filed: Nov. 13, 1998

Related U.S. Application Data

(63) Continuation-in-part of application No. 08/975,268, filed on Nov. 21, 1997.

(60) Provisional application No. 60/088,478, filed on Jun. 5, 1998, and provisional application No. 60/093,217, filed on Jul. 17, 1998.

(51) Int. Cl.[7] .................................................. G06K 15/00

(52) U.S. Cl. ........................................... 345/802; 345/805

(58) Field of Search .................................... 345/127, 339, 345/343–345, 346, 802, 805, 790

(56) References Cited

U.S. PATENT DOCUMENTS 4,476,464 10/1984 Hobbs .
4,586,035 4/1986 Baker et al. .
4,642,790 2/1987 Minshull et al. .
4,649,499 3/1987 Sutton et al. ........................ 364/518
4,710,761 12/1987 Kapur et al. .
4,868,765 9/1989 Diefendorff .
4,972,264 11/1990 Bishop et al. ....................... 358/183
5,001,697 3/1991 Torres .
5,060,170 10/1991 Bourgeois et al. .
5,072,412 12/1991 Henderson, Jr. et al. .
5,119,082 6/1992 Lumelsky et al. ................... 340/731
5,146,556 9/1992 Hullot et al. ......................... 395/159
5,202,961 4/1993 Mills et al. .......................... 395/159
5,339,390 8/1994 Robertson et al. .
5,371,871 12/1994 Spilo .................................... 395/425
5,394,521 2/1995 Henderson, Jr. et al. ........... 395/158
5,418,572 5/1995 Nonweiler et al. .................. 348/446
5,473,745 12/1995 Berry et al. .
5,491,795 2/1996 Beaudet et al. .
5,513,342 4/1996 Leong et al. .
5,521,614 5/1996 Kotha et al. .

(List continued on next page.)

FOREIGN PATENT DOCUMENTS

0419765A1 4/1991 (EP) .
0 564 174 A2 10/1993 (EP) .
0747805A1 12/1996 (EP) .
WO 96 34467 10/1996 (WO) .
WO 99/27517 6/1999 (WO) .

OTHER PUBLICATIONS

"Control Strip en Desktop Strip," *Apple World Magazine*, pp. 73–74, XP002152897, Jul. 1995.
"Flexible Tool Bar," *IBM Technical Disclosure Bulletin 36(8)*:91, XP000390153, Aug. 1993.
"Internet Kiosk Touch Panel Shell," *IBM Technical Disclosure Bulletin 39(8)*:85–87, XP000638146, Aug. 1996.

(List continued on next page.)

*Primary Examiner*—Steven Sax
(74) *Attorney, Agent, or Firm*—Seed IP Law Group PLLC

(57) ABSTRACT

A method for creating and accessing a graphical user interface in the overscan area outside the area of the display normally utilized by the common operating systems. This normal display area is generally known as the "desktop". The desktop serves as a graphical user interface to the operating system. The desktop displays images representing files, documents and applications available to the user. The desktop is restricted in the common environments to a predetermined set of resolutions (e.g., 640×480, 800×600, 1024×768) as defined by VGA and SVGA standards. Displayable borders outside this area are the overscan area.

55 Claims, 12 Drawing Sheets

U.S. PATENT DOCUMENTS

| | | | | |
|---|---|---|---|---|
| 5,561,471 | | 10/1996 | Kim et al. | 348/565 |
| 5,586,244 | | 12/1996 | Berry et al. . | |
| 5,621,428 | | 4/1997 | King et al. . | |
| 5,621,904 | | 4/1997 | Elliott et al. | 395/342 |
| 5,625,782 | | 4/1997 | Soutome et al. . | |
| 5,675,755 | | 10/1997 | Trueblood . | |
| 5,724,104 | | 3/1998 | Eom | 348/569 |
| 5,742,797 | | 4/1998 | Celi, Jr. et al. | 395/507 |
| 5,745,109 | | 4/1998 | Nakano et al. . | |
| 5,757,386 | | 5/1998 | Celi, Jr. et al. | 345/507 |
| 5,764,964 | | 6/1998 | Dwin et al. | 395/509 |
| 5,771,041 | | 6/1998 | Santos-Gomez | 345/342 |
| 5,818,416 | | 10/1998 | Hwang | 345/127 |
| 5,831,592 | | 11/1998 | Cahill, III | 345/127 |
| 5,838,296 | | 11/1998 | Butler et al. | 345/127 |
| 5,864,347 | | 1/1999 | Inoue | 345/516 |
| 5,874,937 | | 2/1999 | Kesatoshi | 345/127 |
| 5,874,965 | | 2/1999 | Takai et al. | 345/357 |
| 5,940,077 | | 8/1999 | Amro | 345/342 |
| 6,018,332 | * | 1/2000 | Nason et al. | 345/127 |
| 6,025,841 | | 2/2000 | Finkelstein et al. | 345/342 |

OTHER PUBLICATIONS

"Method and Apparatus for a Graphical Dial Interface," *IBM Technical Disclosure Bulletin 37(1)*:403, XP000428826, Jan. 1994.

"Single–Click Action Buttons," *IBM Technical Disclosure Bulletin 37(3)*:93, XP000441391, Mar. 1994.

"Three–Dimensional Selection Widget," *IBM Technical Disclosure Bulletin 38(2)*:423, XP000502528, Feb. 1995.

Van Name et al., "Easing the RAM–Cram Blues," Byte 15(3):227–228, 230, 232, XP000652459, Mar. 1990.

"Co–ordinating Multiple Graphical User Interfaces Video Access", IBM Technical Disclosure Bulletin, vol. 39, No. 5, May 1996, pp. 7–9, XP000584036, New York, U.S.

Keith A1 Lantz and Richard F. Rachid, "Virtual Terminal Management in a Multiple Process Environment", Proceedings of the Seventh Symposium on Operating System Principles, Association for Computing Machinery, Dec. 10–12, 1979, pp. 86–97.

Norman Meyowitz, Margaret Moser, "Bruwin: An Adaptable Design Strategy for Window Manager/Virtual Terminal Systems", Proceedings of the Eighty Symposium on Operating Systems Principles, Association for Computing Machinery, vol. 15 No. 5, Dec. 1981, pp. 180–189.

Stefan Stille, Shailey Minocha and Rolf Ernst, "A2DL—An Adaptive automatic Display Layout System", Third Annual Symposium on Human Interaction with Complex Systems HICS '96, IEEE Computer Society Press, pp. 243–250.

Ellis S. Cohen, Edward T. Smith, Lee A. Iverson, "Constraint–Based Tiled Windows", IEEE Computer Society Press, May 1986, pp. 35–45.

Michael Gancarz, "Uwm: A User Interface for X Windows", USENIX Association, Summer Conference Proceedings, Jun. 9–13, 1986, pp. 429–440.

Todd Brunhoff, "Pleasing the Eye", UNIX Review, vol. 7 No., 10 pp. 65–72.

* cited by examiner

SECONDARY USER INTERFACE

RELATED APPLICATIONS

This application is a continuation-in-part of application Ser. No. 08/975,268, filed Nov. 21, 1997, entitled Overscan User Interface and claims the priority of provisional application Ser. No. 60/088,478 filed Jun. 5, 1998 and provisional application Ser. No. 60/093,217 filed Jul. 17, 1998, all of which incorporated herein by reference.

BACKGROUND OF THE INVENTION

1. Field of the Invention

This invention relates to computer user interface displays and, in particular, the use of a user interface separate from the standard user interface display.

2. Description of the Prior Art

There was a time when the most popular operating system for personal computers (DOS) did not include a graphical user interface. Any company could create a "menu" or "shell" which would be the first program launched upon starting the computer and which would present options to the user for launching and managing various applications. Although graphics programming was difficult in the DOS environment, some companies even created graphical user interfaces that could then launch other programs.

Microsoft Corporation of Redmond, Washington, introduced such a graphical user interface for launching applications which it called "Windows". The first three versions of Windows were merely applications which ran under DOS and could be one of numerous items to be selected from a previously running shell or menu which might be offered by a company other than Microsoft. This continued to allow other companies to offer primary user interface programs to users without the user going through a Microsoft controlled user interface.

However, with the introduction by Microsoft of Windows 95™, the initial loading of the operating system presents a Microsoft-developed graphical user interface at the outset, which occupies the entire screen display. As with its previous operating system products, Microsoft arranged with manufacturers of the standard computer hardware to include this operating system with each computer sold. With Microsoft's domination of this market, it became impossible for other software vendors to present an interface to users other than as a Microsoft style icon within the Microsoft "desktop" consisting of the entire screen display. This prompted a need for access to a user interface which could be presented outside of the standard computer screen display and therefore independent of the dictates of Microsoft for items within its "desktop".

Standard personal computers use VGA or Super VGA or XGA video display systems. These display systems operate in standardized graphics modes such as 640×480 pixels, 800×600 pixels, 1024×768 pixels, and 1280×1024 pixels. When one of these display modes is selected, this is the entire area available for display. In the Microsoft Windows environment, the user instructs the Windows operating system to select one of these standard display modes and the Windows operating system then presents all of the applications and their icons within the selected display area. There is no way at present to cause the Windows "desktop" to use less than the entire display area and still function as intended and allow another program from another vendor to control the remainder. What is needed is the ability to move obstructing video memory out of the way, and to make sure that nothing else that would be obstructing can subsequently be allocated into that space

SUMMARY OF THE INVENTION

The invention is a technique provided for adding and using a new user interface added to the standard user graphical display interface, for example in the border beyond the standard screen display area. Conventional video systems, such as VGA, SVGA and XGA video systems, include a defined border surrounding the display area. The original purpose of this border was to allow adequate time for the horizontal and vertical retrace of the electron gun in a cathode ray tube display. However, with the advent of LCD displays and as retrace speeds have increased in modern monitors, it is now possible to present a user interface display in this border. The border which can be controlled as a user interface is a portion of what is known as the "overscan". This invention is a method for presenting one or more additional or secondary user interfaces, for example, in the overscan area surrounding the conventional user interface display often called the desktop.

When the electron gun in a CRT retraces to the left of the screen or the top of the screen, it requires a significant amount of time relative to the presentation of a scanned line of data. During the retrace, the electron gun is turned off ("blanked"). If the blanking time required for the retrace is equal to the amount of time available, there is no usable overscan. However, modern monitors have become much faster in their retrace speeds, leaving a significant amount of time when the electron gun need not be blanked, allowing a displayable border. In the prior art, although the border is usually "black" (the gun is turned off), it is well known to specify that the border shall be given any one of six colors. Standard BIOS allows a specification of this color. The desired color is simply specified in one of the registers for the video controller. No data for this color is stored in the buffer of video memory for the display. This invention establishes an additional video buffer for the border and allows this buffer to be written with display data like the regular display buffer. The display area is thereby expanded, on one or more edges, to provide a visible area previously invisible. The pixels within this newly visible area of the display are made accessible to programs through an application programming interface (API) component of this invention. A program incorporating a graphical user interface may be displayed in the previously blanked area of the display, functionally increasing the accessible area of the display without hardware modification.

The invention is a method for displaying an image on a video display system in an area outside of the primary display area generated by the video display system. Two dimensions define the standard display area, each specifying a number of pixels. Selecting a video "mode" specifies these dimensions. The method is accomplished by adjusting parameters for the video display system to increase the number of pixels in at least one dimension of the display system. The number of pixels which is added is less than or equal to the difference between the number of pixels specified in the video mode and a maximum number of pixels which the video display system can effectively display. This difference is the overscan area. Because all interface displays are created by writing a desired image to a buffer or memory for the video display, the method requires allocating additional video display memory for the increased pixels. The image written to such memory is then displayed by the system alongside the original display area.

In a first embodiment, only the vertical dimension is increased and the overscan user interface is presented above or below the primary display area. Alternatively, the horizontal dimension may be increased and the overscan user interface displayed to the right or the left of the primary display area. Similarly, the interface image may be displayed on any or all of the four sides of the primary display area.

DETAILED DESCRIPTION OF A PREFERRED EMBODIMENT

The present invention includes techniques for providing and using a secondary or additional user interface, preferably a secondary graphical user interface or secondary GUI, to be present on the display at least apparently simultaneously with the primary user interface, such as the conventional desktop GUI.

Figure 1:
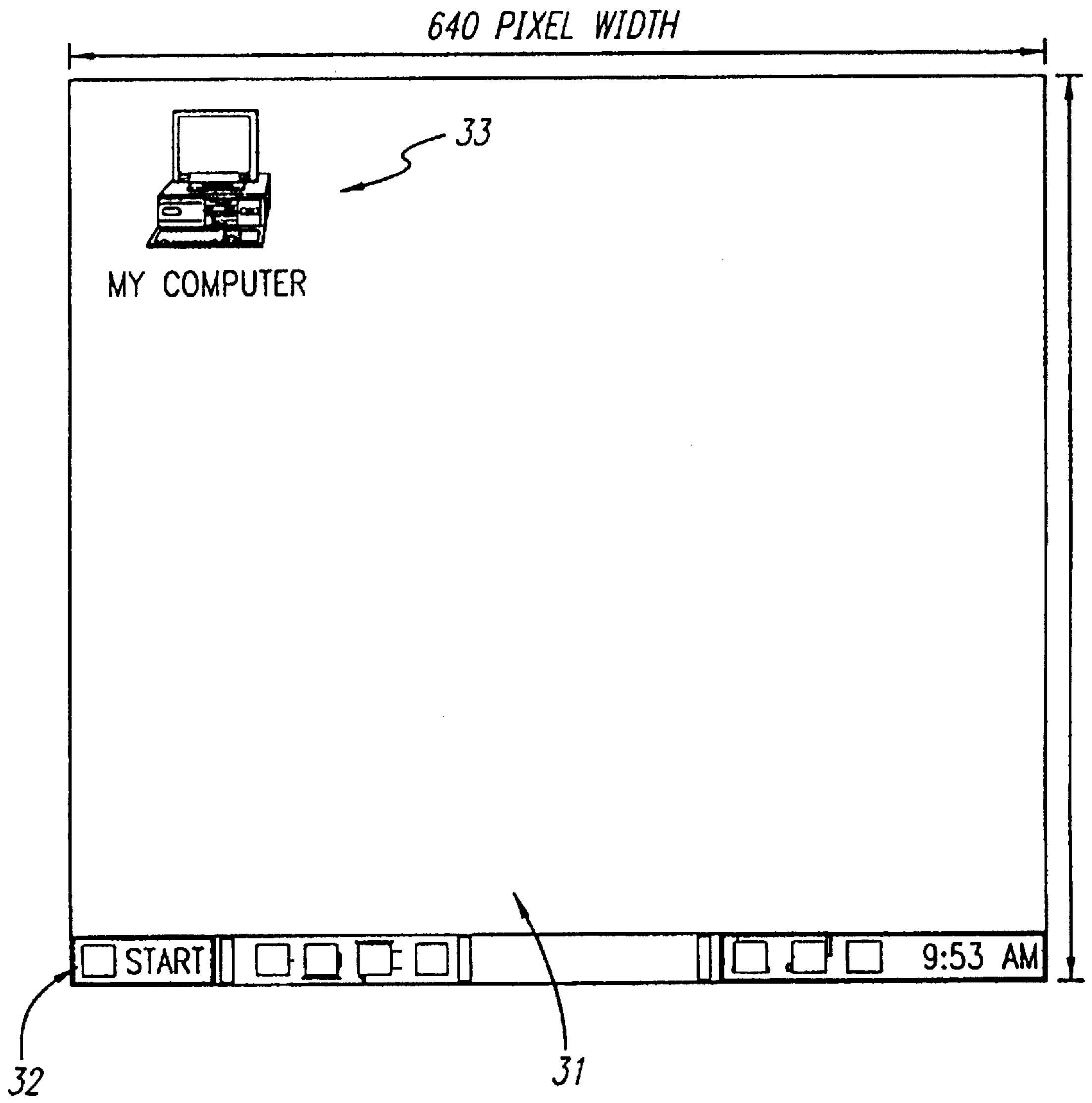
FIG. 1 PRIOR ART
FIG. 1 shows a standard display of the prior art.

In a preferred embodiment, programming mechanisms and interfaces in a computer system provide the secondary GUI in a convenient and currently unused potential display area by providing access and visibility to a portion of the monitor display normally ignored and inaccessible (hereinafter "overscan area"). FIG. 1 shows a standard prior art display desktop running Microsoft Windows 95™. Within the desktop 31 are the taskbar 32 and desktop icons 33.

Figure 2:
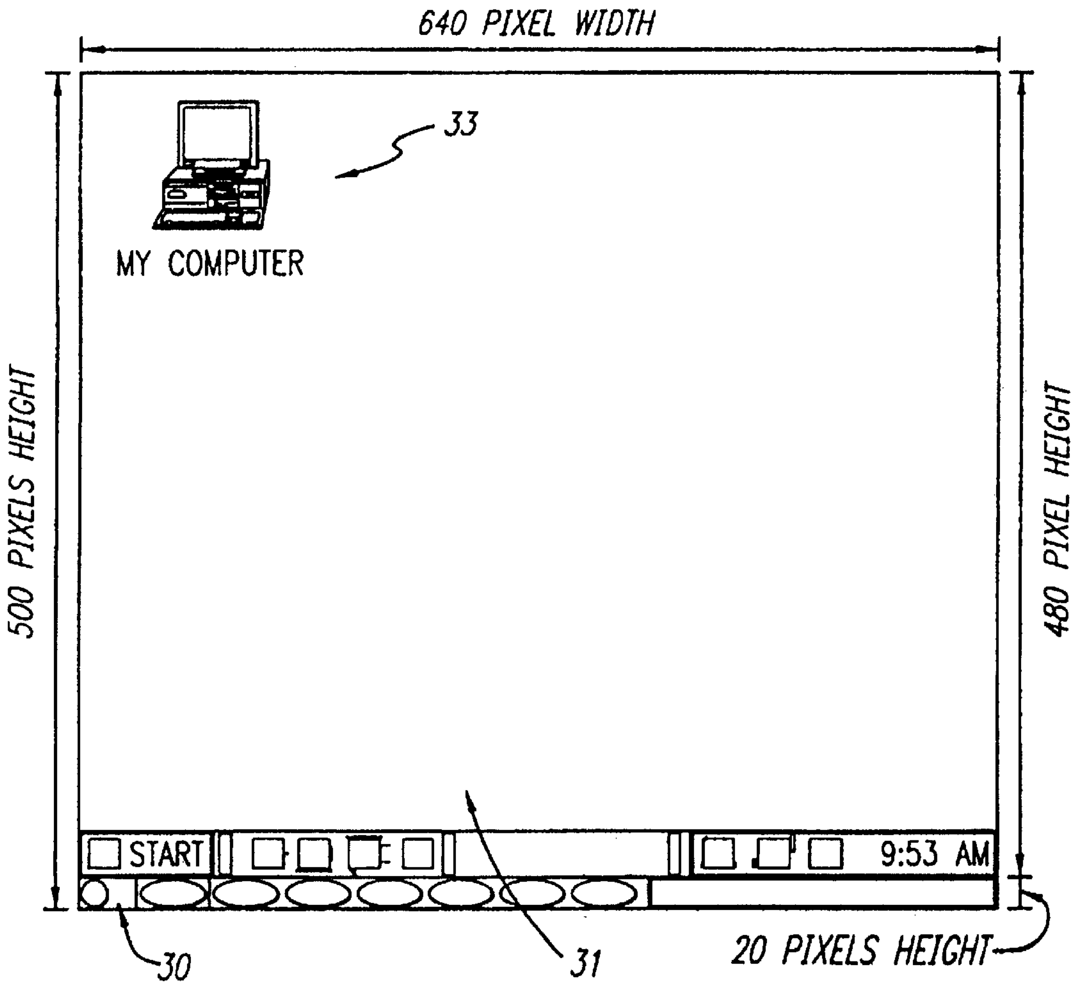
FIG. 2 shows a standard display with an overscan user interface in the bottom overscan area.
Figure 3:
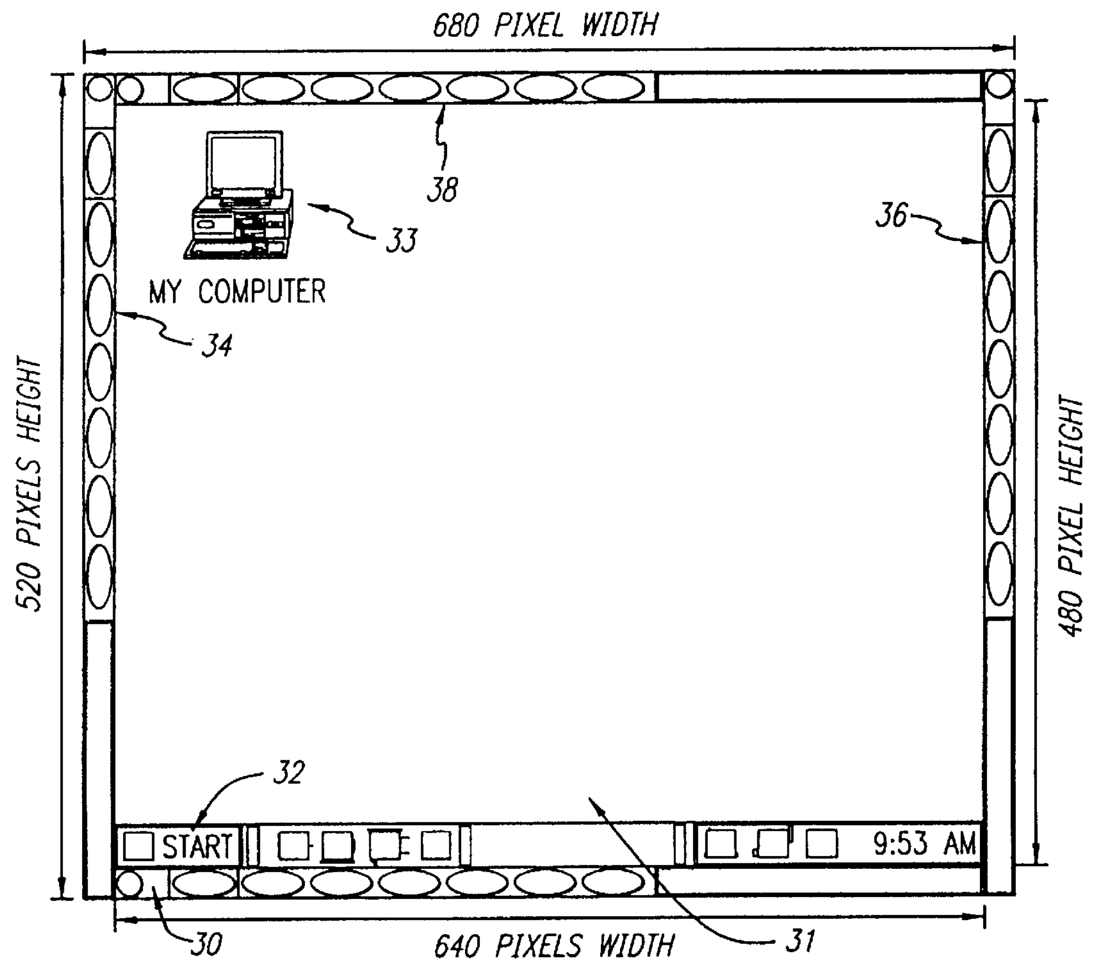
FIG. 3 shows a standard display with an overscan user interface on all four borders of the display.

In a preferred embodiment of the present invention, a graphical user interface image is painted onto one or more of the sides of the overscan area as shown in FIGS. 2 and 3. FIGS. 2 and 3 show depictions of a Super VGA (SVGA) display with the addition of a graphical bar user interface displayed in the overscan area. The overscan user interface bar 30 is defined to reside outside the borders of the "desktop" display area 31. In FIG. 2, the display is modified to include a graphical user interface 30 in a bar 20-pixels high below the bottom edge. In FIG. 3, the display is modified to include a graphical user interface in four bars each 20-pixels high/wide outside each of the four display edges: a bottom bar 30, a left side bar 34, a right side bar 36, and a top bar 38.

The overscan interface may include, and is not limited to, buttons, menus, application output controls (such as a "ticker window"), animations, and user input controls (such as edit boxes). Because the overscan interface is not obscured by other applications running within the standard desktop, the overscan interface may be constantly visible or it may toggle between visible and invisible states based upon any of a number of programming parameters (including, but not limited to, the state of the active window, the state of a toggle button, etc.).

Figure 4:
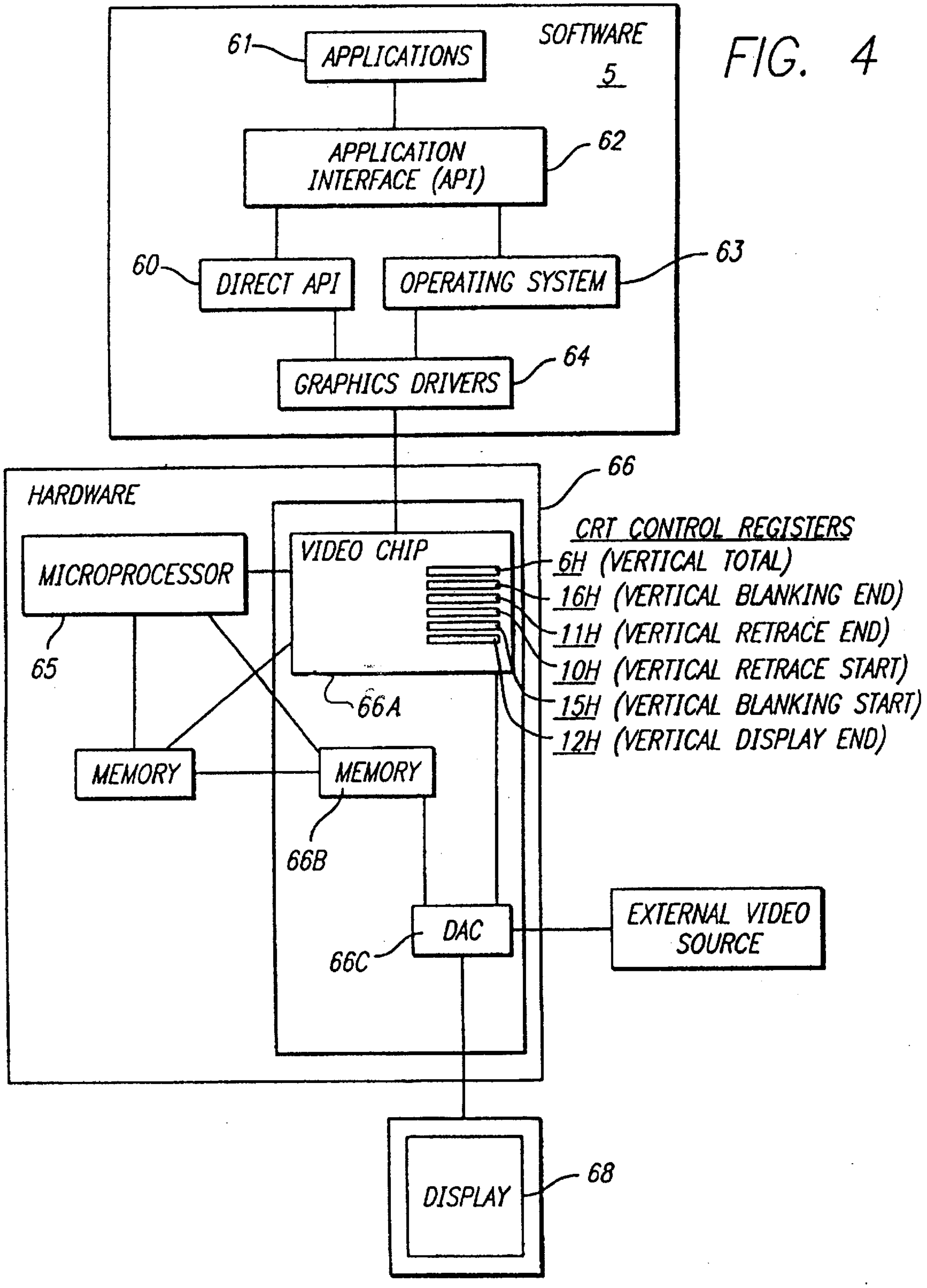
FIG. 4 shows the components of the computer system that relate to the video display system.

FIG. 4 shows the primary components of the computer system that relate to the video display system. Within the software component S are the operating system 63 and the applications 61. Within the protected modes of modern systems, applications 61 do not have direct access to the video or Graphics Drivers 64 or hardware components such as the video card 66 which contains the video chipset 66A, 66B and 66C. Abstraction layers such as Application Interface (API) 60, and/or Direct API 62, provide limited access, often through the operating system 63.

The invention provides a technique for painting and accessing an area of the computer display not normally accessible, or used, in graphics modes. In the Microsoft Windows environments (including Microsoft Window 95 and derivatives, and Microsoft Windows NT 4.0 and derivatives) and other contemporary operating environments, the primary display area "desktop" is assigned by the operating system to be one of a set of pre-determined video "modes" such as those laid out in Tables 1 and 2 below, each of which is predefined at a specific pixel resolution. Thus, the accessible area of the computer display may not be modified except by selecting another of the available predefined modes.

TABLE 1

ROM BIOS video modes

| Mode Number | Resolution | Mode Colors | Buffer Type | Segment |
|---|---|---|---|---|
| 00H | 42 × 25 chars (320 × 350 pixels) | 16 | Alpha | B800 |
| 00H | 42 × 25 chars (320 × 350 pixels) | 16 | Alpha | B800 |
| 00H | 42 × 25 chars (320 × 400 pixels) | 16 | Alpha | B800 |
| 00H | 42 × 25 chars (320 × 400 pixels) | 16 | Alpha | B800 |
| 01H | 42 × 25 chars (320 × 200 pixels) | 16 | Alpha | B800 |
| 01H | 42 × 25 chars (320 × 350 pixels) | 16 | Alpha | B800 |
| 01H | 42 × 25 chars (320 × 400 pixels) | 16 | Alpha | B800 |
| 01H | 42 × 25 chars (320 × 400 pixels) | 16 | Alpha | B800 |
| 02H | 80 × 25 chars (640 × 200 pixels) | 16 | Alpha | B800 |
| 02H | 80 × 25 chars (640 × 350 pixels) | 16 | Alpha | B800 |
| 02H | 80 × 25 chars (640 × 400 pixels) | 16 | Alpha | B800 |
| 02H | 80 × 25 chars (640 × 400 pixels) | 16 | Alpha | B800 |
| 03H | 80 × 25 chars (640 × 200 pixels) | 16 | Alpha | B800 |
| 03H | 80 × 25 chars (640 × 350 pixels) | 16 | Alpha | B800 |
| 03H | 80 × 25 chars (640 × 400 pixels) | 16 | Alpha | B800 |
| 03H | 80 × 25 chars (720 × 400 pixels) | 16 | Alpha | B800 |
| 04H | 320 × 200 pixels | 4 | Graphics | B800 |
| 05H | 320 × 200 pixels | 4 | Graphics | B800 |
| 06H | 840 × 200 pixels | 2 | Graphics | B800 |
| 07H | 80 × 25 chars (720 × 350 pixels) | 2 | Alpha | B000 |
| 07H | 80 × 25 chars (720 × 400 pixels) | 2 | Alpha | B000 |
| 0DH | 320 × 200 pixels | 16 | Graphics | A000 |
| 0EH | 640 × 200 pixels | 16 | Graphics | A000 |
| 0FH | 640 × 350 pixels | 4 | Graphics | A000 |
| 10H | 640 × 350 pixels | 4 | Graphics | A000 |

TABLE 1-continued

ROM BIOS video modes

| Mode Number | Resolution | Mode Colors | Buffer Type | Seg-ment |
|---|---|---|---|---|
| 10H | 640 × 350 pixels | 16 | Graphics | A000 |
| 11H | 640 × 480 pixels | 2 | Graphics | A000 |
| 12H | 640 × 480 pixels | 16 | Graphics | A000 |
| 13H | 320 × 200 pixels | 256 | Graphics | A000 |

TABLE 2

SVGA video modes defined in the VESA BIOS extension

| Mode Number | Resolution | Mode Colors | Buffer Type |
|---|---|---|---|
| 100H | 640 × 480 pixels | 256 | Graphics |
| 101H | 640 × 480 pixels | 256 | Graphics |
| 102H | 800 × 600 pixels | 16 | Graphics |
| 103H | 800 × 600 pixels | 256 | Graphics |
| 104H | 1024 × 768 pixels | 16 | Graphics |
| 105H | 1024 × 768 pixels | 256 | Graphics |
| 106H | 1280 × 1024 pixels | 16 | Graphics |
| 107H | 1280 × 1024 pixels | 256 | Graphics |
| 108H | 80 × 60 chars | 16 | Alpha |
| 109H | 132 × 25 chars | 16 | Alpha |
| 10AH | 132 × 43 chars | 16 | Alpha |
| 10BH | 132 × 50 chars | 16 | Alpha |
| 10CH | 132 × 60 chars | 16 | Alpha |
| 10DH | 320 × 200 pixels | 32,768 | Graphics |
| 10EH | 320 × 200 pixels | 65,536 | Graphics |
| 10FH | 320 × 200 pixels | 16,777,216 | Graphics |
| 110H | 640 × 480 pixels | 32,768 | Graphics |
| 111H | 640 × 480 pixels | 65,536 | Graphics |
| 112H | 640 × 480 pixels | 16,777,216 | Graphics |
| 113H | 800 × 600 pixels | 32,768 | Graphics |
| 114H | 800 × 600 pixels | 65,536 | Graphics |
| 115H | 800 × 600 pixels | 16,777,216 | Graphics |
| 116H | 1024 × 788 pixels | 32,768 | Graphics |
| 117H | 1024 × 768 pixels | 65,536 | Graphics |
| 118H | 1024 × 768 pixels | 16,777,216 | Graphics |
| 119H | 1280 × 1024 pixels | 32,768 | Graphics |
| 11AH | 1280 × 1024 pixels | 65,536 | Graphics |
| 11BH | 1280 × 1024 pixels | 16,777,216 | Graphics |

Figure 6:
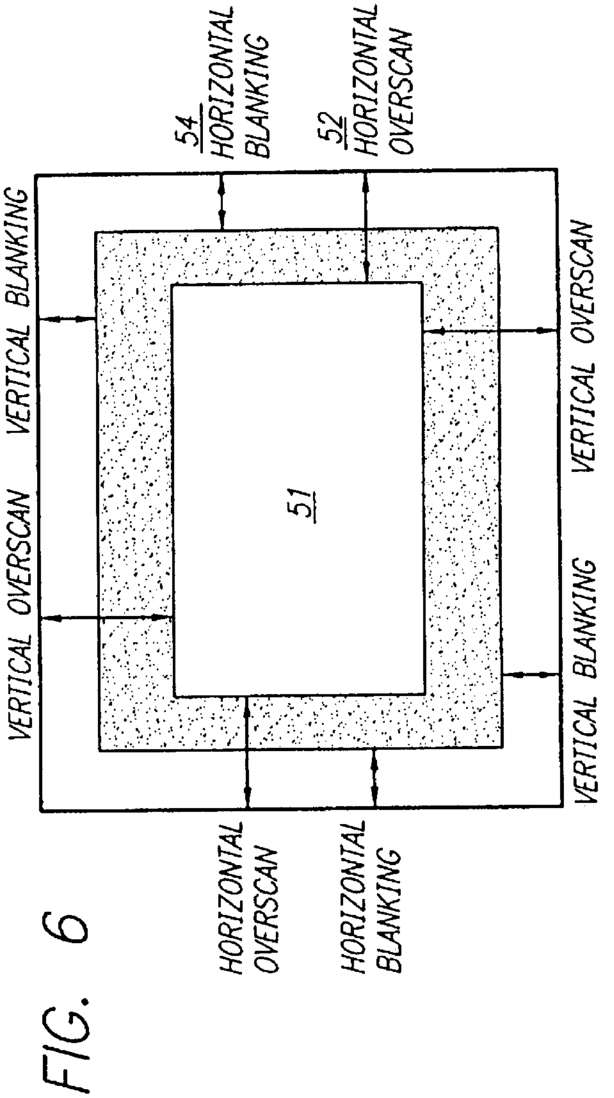
FIG. 6 shows the usable border within the vertical overscan and the horizontal overscan surrounding the standard display.

As shown in FIG. 6, a displayed image is "overscanned". That is, the displayed video buffer data occupies less than the entire drivable screen size. The width of the usable overscan border depends on the amount of the horizontal overscan 52 reduced by the horizontal blanking 54 and the amount of the vertical overscan 53 reduced by the vertical blanking 55.

In a first preferred embodiment, only a border at the bottom of the standard display area is used. Consequently, only the vertical control parameters for the cathode ray tube (CRT) controller, shown as Control Registers 6H, 16H, 11H, 10H, 12H and 15H in FIG. 4 need to be adjusted. These parameters and others are shown in Table 3 below:

TABLE 3

Vertical timing parameters for CR programming.

| Register | Name | Description |
|---|---|---|
| 6H | Vertical Total | Value = (total number of scan lines per frame) - 2 The high-order bits of this value are stored in the overflow registers. |
| 7H | Overflow | High-order bits from other CR registers. |
| 10H | Vertical Retrace Start | Scan line at which vertical retrace starts. The high-order bits of this value are stored in the overflow registers. |
| 11H | Vertical Retrace End | Only the low-order 4 bits of the actual Vertical Retrace End value are stored. (Bit 7 is set to 1 to write-protect registers 0 through 7.) |
| 12H | Vertical Display End | Scan line at which display on the screen ends. The high-order bits of this value are stored in the overflow registers. |
| 15H | Start Vertical Blank | Scan line at which vertical blanking starts. The high-order bits of this value are stored in the overflow registers. |
| 16H | End Vertical Blank | Scan line at which vertical blanking ends. The high order bits of this value are stored in the overflow registers. |
| 59H–5AH | Linear Address Window Position | Linear address window position in 32-bit CPU address space. |

In the standard 640×480 graphics mode, the nominal horizontal scan rate is 31.5 KHz (31,500 times per second) with a vertical scan rate of 60 Hz (60 frames per second). So the number of lines in one frame is $^{31,500}/_{60}$, or 525. Because only 480 lines of data need to be displayed, there are 525−480, or 45, lines available for vertical overscan. Leaving a more than adequate margin for retrace, which requires only 2 lines worth of time, the preferred embodiment uses 20 lines for the invented overscan display.

The disclosed method of the preferred embodiment of the present invention is accomplished by achieving three requirements:

(1) to address and modify the visible resolution of the video display system such that portions of the overscan area are visible as shown in FIG. 6, (2) to address and modify the video display contents for the visible portion of the overscan area, and (3) to provide an application programming interface (API) or other mechanism to allow applications to implement this functionality.

Figure 7:
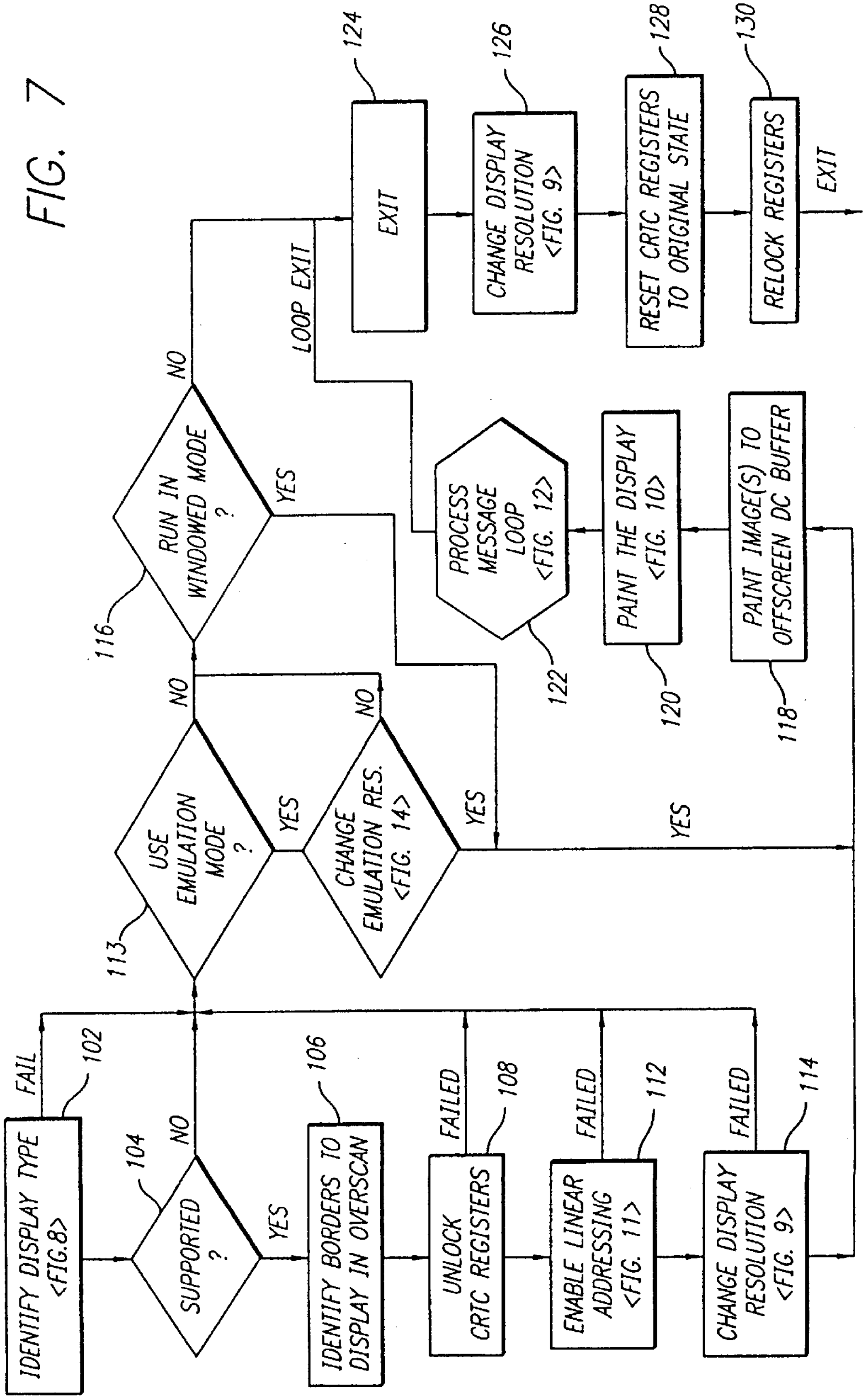
FIG. 7 is an overview flow chart showing the operation of a preferred embodiment of the present invention.

FIG. 7, and the additional details and sub-steps provided in FIGS. 8–13, provides a flow chart of an implementation of a preferred embodiment of the present invention meeting the requirements described above. The environment of this implementation is a standard Microsoft Windows 95™ operating environment, using Microsoft Visual C and Microsoft MASM for the development platform. That is not to imply that this invention is limited in scope to that environment or platform. The invention could be implemented within any graphical interface environment, such as X-Windows, OSF Motif, Apple OS, a Java OS, and others in which similar video standards (VGA, SVGA, XGA, 8514/A) are practiced. The reference books PC Video Systems by Richard Wilton, published by Microsoft Press and Programmer's Guide to the EGA, VGA, and Super VGA Cards by Richard F. Ferrano, published by Addison Wesley provide more than adequate background information to implement this embodiment.

Referring now in particular to FIG. 7, upon initialization, at Identify Display Type step 102, the program attempts to determine the display type, and current location in memory used by the display driver, in order to determine the size and locations of any display modifications to be made, e.g. to the size and location of overscan area(s) to be used.

Figure 8:
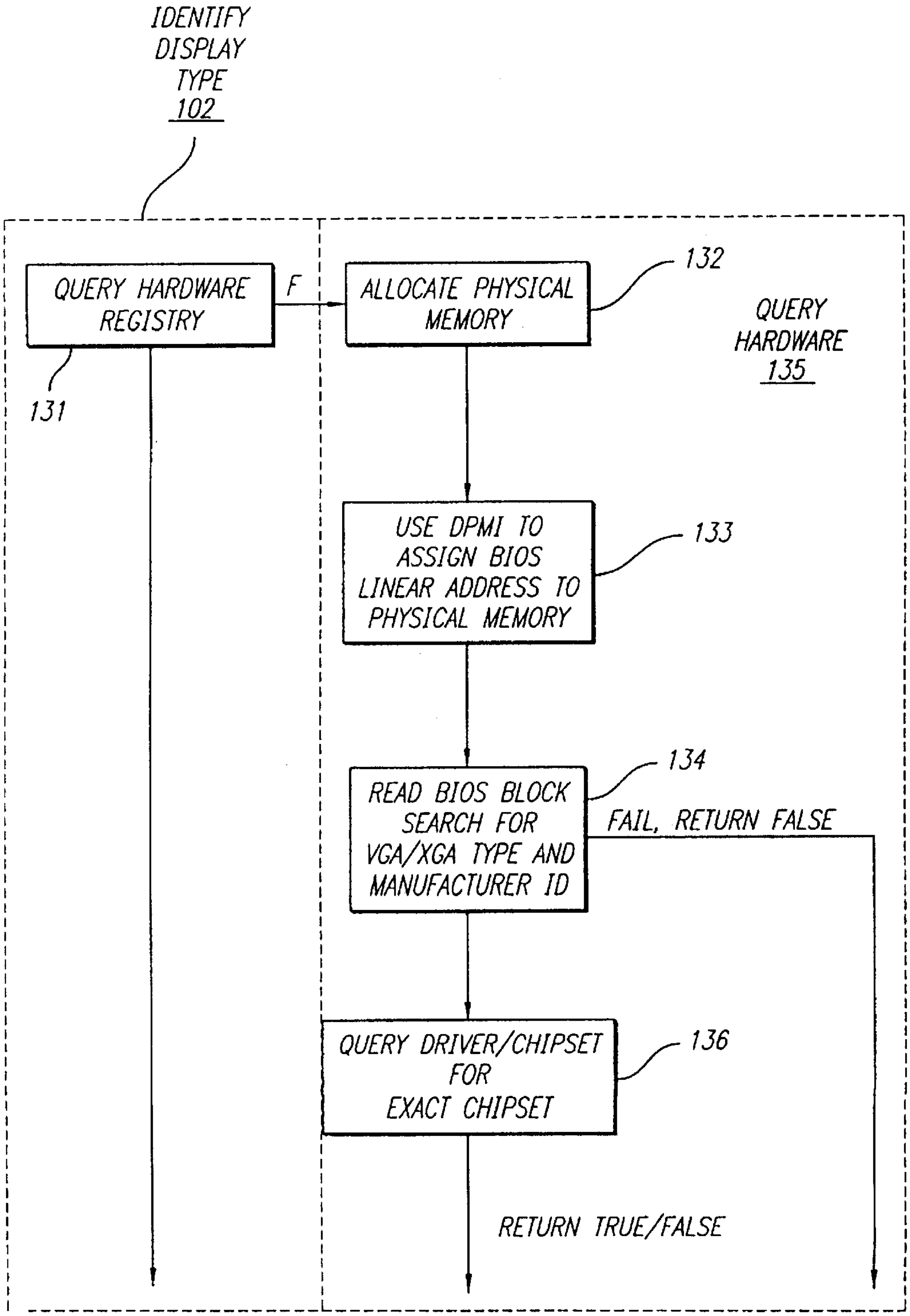
FIG. 8 is a flowchart of the sub-steps in Identify Display step 102 of FIG. 7.

As described in further detail in FIG. 8, the program first queries the hardware registry in Query Hardware Registry, step 131, to attempt to determine the registered display type. If successful, the program then determines compatibility information in Display Type Supported, step 135, to verify that the program supports that display type and determine memory allocation information.

If the hardware registry information is unavailable, as determined in step 131, or the display type determined in step 131 is unsupported as determined by step 104, the program may use an alternate approach, shown as subroutine Query hardware, steps 135 in FIG. 8, to query the BIOS, in step 134, and the video chipset 66, in step 136, for similar information as described immediately below.

If the BIOS is to be accessed in step 134, physical memory is first allocated in Allocate Physical Memory, step 132, and accessed using Microsoft's DPMI (DOS Protected Mode Interface) to map it to the linear memory address in which the BIOS resides in Use DPMI to assign BIOS linear address to physical memory, step 133.

Thereafter, the program queries the BIOS in Read BIOS block, Search for VGA/XVA type and manufacturer ID, step 134. If successful, the driver and chipset are then further queried to determine the display type and memory location in Query driver/chipset for exact chipset, step 136.

If the compatibility information does not indicate a standard VGA, SVGA, XGA, or 8514/A signature, step 134, this routine returns a failure. If a known chipset manufacturer's identification is found, the driver and/or chipset may be queried with manufacturer-specific routines, step 136, to identify and initialize, as necessary, the specific chipset.

If, at step 104, the program was unable to finally unable to identify the display type, either because the registry query in step 131 or the hardware query in step 135 was unsuccessful, the user may be prompted at Run in windowed mode, step 116, as to whether the program should continue to run as a standard "application bar" or "toolbar". The program may either exit or proceed to run as a toolbar on the desktop.

Returning now to FIG. 8, if a supported display type is detected, the program then determines the screen borders to be accessed in Identify borders to display in overscan, step 106, based upon user preferences, and determines, as necessary, whether sufficient video memory exists to make the necessary display changes. For example, if the screen is currently set to a 1024×768 resolution at 16 bits-per-pixel, and the program is to include four graphical interface bars, one on each edge, with each bar 20 pixels deep, the program must check that video memory is greater than 1.7 MB (required number of bytes=Pixels Width * BitsPerPixel * PixelsHeight).

The controller registers 6H, 16H, 11H, 10H, 12H and 15H as shown in FIG. 4 and detailed in Table 3, may be accessed through standard input/output ports, using standard inp/outp functions. The CR registers 6H, 16H, 11H, 10H, 12H and 15H must first be unlocked, as indicated in Unlock CRTC registers, step 108 in FIG. 7, to make them writeable. They are unlocked by clearing bit 7 in controller register 11H.

Addressing of video memory, step 112, is accomplished through one of several means. One is to use the standard VGA 64 Kb "hardware window", moving it along the video memory buffer 67 (FIG. 4) in 64 Kb increments as necessary. The preferred method is to enable linear addressing by querying the video chipset for the linear window position address, step 138 of FIG. 11. This 32-bit offset in memory allows the program to map the linear memory to a physical address, steps 140 and 142 of FIG. 11, that can be manipulated programmatically.

Figure 9:
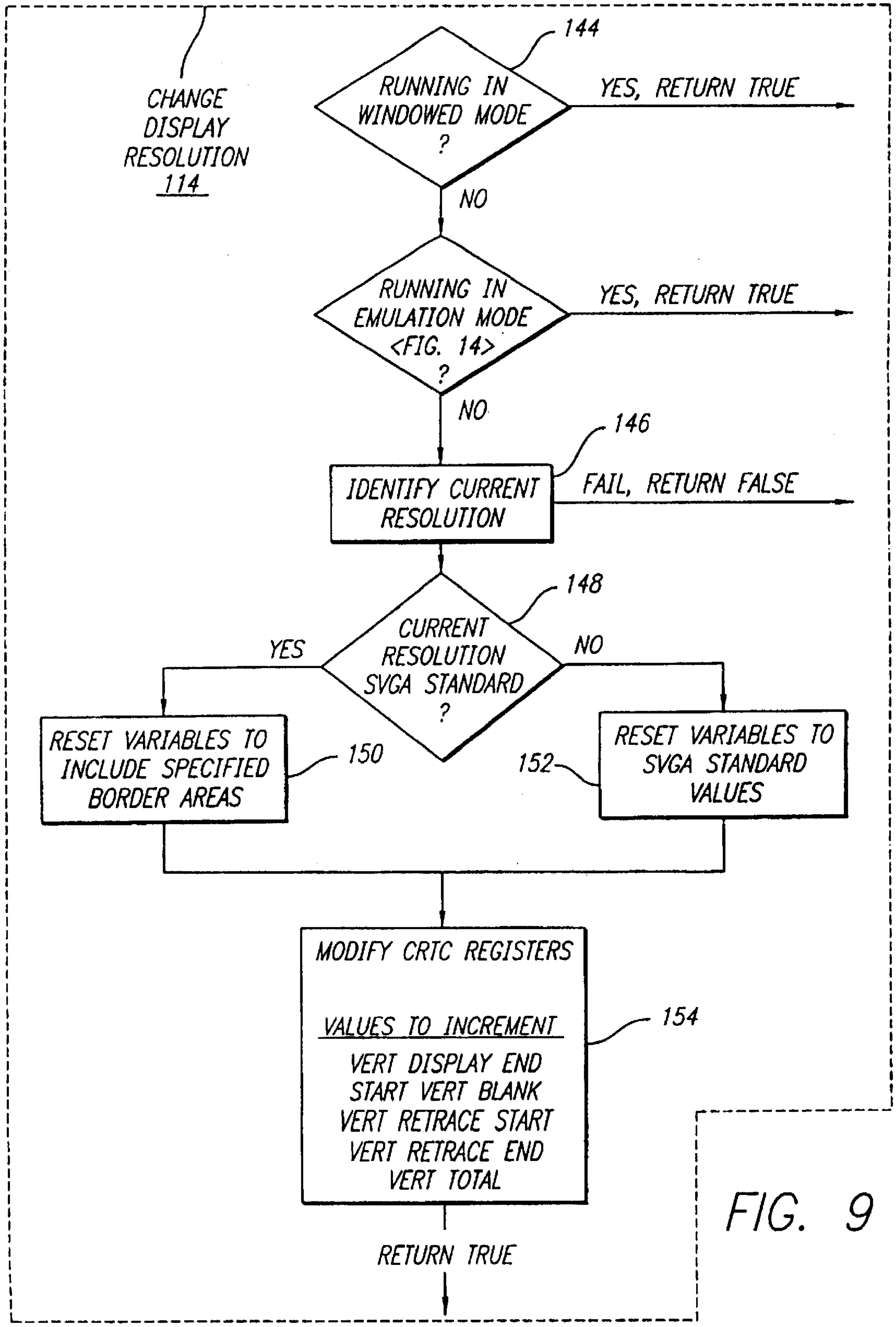
FIG. 9 is a flowchart of the sub-steps of changing the display resolution step 114 of FIG. 7.

At this point the program can modify the display, step 114 and FIG. 9, to increment the border areas. This routine first checks to determine whether or not the system is running in "toolbar" mode, step 144, and, if so, returns true. If not, it then determines whether to reset all registers and values to their original state, effectively returning the display to its original appearance, step 152. The determination is based upon a number of parameters, such as whether the current resolution, step 146, reflects a standard value or previous programmatic manipulation, step 148. If a standard resolution is already set, the variables are reset to include the specified border areas, step 150. The CR registers are incremented, step 154, to modify the scanned and blanked areas of the display. If the top or side areas are modified, existing video memory is moved accordingly in step 162 of FIG. 10.

If any of the foregoing routines returns a failure, the program may prompt the user to determine whether "emulation" mode, step 13, or windowed mode step 116 should be used or if the program should exit at step 124.

In its simplest form, the invention can be treated as a technique for adding a secondary GUI by reconfiguring the actual display mode to add a modified, non-standard GUI mode in which the standard display size or resolution has been increased to include a secondary display in addition to the primary display. For example, a standard 640×480 display is modified in accordance with the present invention to become a larger display, one section of which corresponds to the original 640×480 display while another section corresponds to a 640×25 secondary GUI display.

There are various techniques or mechanisms required for modifying the system to include the secondary GUI, depending upon the requirements of the secondary GUI and upon the present circumstances of the unmodified system.

In another embodiment of the present invention system resources are allocated for a secondary GUI by fooling the video driver into going to larger resolution. This technique automatically guarantees that enough space is kept clean, since the video driver allocates system resources according to the resolution that the video driver believes it will be operating in. To operate one or more secondary user interfaces in one or more areas of the screen it is necessary to have the memory that was associated in video memory or in the frame buffer with that location, contiguously below the primary surface free and available. By writing a series of small applets specific to hardware known to have system resource allocation problems for a secondary user interface, the secondary user interface application may run such applet whenever resolutions will be switched and initializing the chip set pertinent to that particular applet. If the application finds an applet pertinent to the current particular chip set it will be launched. The applet or minidriver initializes itself, performs the necessary changes to the driver's video resolution tables, forces a reenable, and sufficient space is subsequently available for one or more secondary user interfaces.

When reenabled, the driver allocates video memory as needed for the primary display according to the data on the UCCO resolution tables. Therefore, the modified values result in a larger allocation. Once the driver has allocated memory necessary for the primary surface, the driver will allow no outside access to the allocated memory. Thus by fooling the driver into believing that it needs to allocate sufficient memory for a resolution exactly x bytes larger than the current resolution where x is the size of one or more secondary user interfaces, the application can be sure that no internal or external use of the allocated memory location can conflict with the secondary user interface.

This method ensures that system resources will be allocated for one or more secondary user interfaces by writing an applet that would address the video driver in such a way as to force the video driver, on its next reenable, to allocate video memory sufficient for a resolution higher than the actual operating system resolution. This may also be done by modifying each instance of the advertised mode tables, and thus creating a screen size larger than the primary user interface screen size.

This technique has an additional benefit of eliminating the need to prevent the driver from actually shifting into the specified larger resolution, handing the primary user interface a larger display surface resolution. The "hardware mode table," a variant of the aforementioned video resolution tables, is not advertised and not accessible. Therefore, when the driver validates the new resolution, checking against the hardware mode table, it will always fail and therefore refuse to shift into that resolution. Because this technique modified the advertised video resolution tables early enough in the driver's process, allocated memory was modified, and memory addresses set before the failure in validate mode. Subsequently when the CRTCs are modified, in step 114, the driver is reserving sufficient memory for one or more secondary user interfaces and not making it unavailable for any other process or purpose.

In yet another embodiment of the present invention, an enveloping driver is installed to sit above the existing driver and shims itself in between the hardware abstraction layer and the actual video driver in order to be able to handle all calls to the video driver and modify the driver and the driver's tables in a much more generic fashion rather than in a chipset specific fashion. The enveloping driver, shims into the primary video driver, transparently passing calls back and forth to the primary video driver. The enveloping driver finds the video resolution tables in the primary video driver which may be in a number of locations within the driver. The enveloping driver modifies the tables (for example, increasing 800 by 600 to 800 by 620). A 1024 by 768 table entry may become 1024 by 800.

Like the previously described embodiment, the primary driver cannot validate the new resolution and therefore cannot actually change the display setting. As a result, the driver allocated memory, allocated the cache space, determined memory address and moved cache and offscreen buffers as necessary. So the primary driver never uses all the space allocated, and will never draw in that space.

As stated earlier, the method of the present invention includes three primary steps, finding the overscan area, increasing or expanding the overscan area, and putting data in the expanded overscan area.

The step of finding the overscan area requires a review of the contents of the Controller Registers, the CR registers, used by VGA compatible chip sets or graphic boards to identify where the overscan area, the blanking, the vertical and horizontal total and the sinking should be set. The CR defines the desktop display, how its synched, where it's laid out left and right, how much buffer area there would be on each side, where it would be stored within the video memory area. A review of the contents of the CR data registers therefore fully defines the location and size of the overscan area.

In order to accomplish the step of expanding the overscan area, the CRs may currently be used directly for systems with video display resolutions up to and including 1024 pixels in any dimension, that is, resolutions which can be defined in the generally accepted VGA standards by 10 bits per register. To expand the overscan area, new data is written into the CR using standard techniques such as the Inp and Outp, functions. A standard video port and MMIO functions may also be used to modify the CRs.

At greater resolutions, 11 bits may be needed to properly define the resolution. There is currently no standard way in which the $11^{th}$ bit location is defined. Therefore, at a resolution above 1280 by 1024, for example, an understanding about the video card itself, particularly how the 11 bits representing the resolution are stored, is currently required and will be described below in greater detail.

When expanding the overscan, it is important to make sure a previous overscan bar is not already displayed, possibly from a previous crash or other unexpected problem. Either the display must be immediately reset to the appropriate resolution defaults, or the CR queried to determine if the total screen resolution as understood by the video card and drivers differs from the screen resolution known by the operating system display interface. An overscan bar may already be displayed if the total screen resolution is not equal to one of the standard VGA or SVGA resolutions. In particular, if the total screen resolution is equal to a standard VGA/SVGA resolution plus the area required for the overscan bar or is greater than the resolution reported by the operating system display interface, the display is reset.

Once the display area or resolution as stored in the CR is determined, the resolution or display area can be extended in several different ways. The overscan area can be added to the bottom, the top, or the right of the current display area, and optionally, the display area can be repositioned so that the overscan bar can remain centered in appearance. Alternatively. the overscan area can be added anywhere and the original or desktop display area can be centered to improve appearance. In any event, the height/width of the display area required for the overscan bar is added to the size of the display area already stored in the CR and the sum is written into the CR, overwriting the previous data.

The screen typically shows a quick flash as it is placed in a different mode, including the original display area plus a new display bar in the overscan area. As soon as that change occurs, a black mask can be positioned over the new areas. The new menu data can then be safely written on top of the black mask so that the user never sees memory "garbage".

There is typically a few seconds of load time during which a simple message can be displayed, such as "Loading . . .", to avoid confusing the user.

There are a number of mechanisms by which this may be done. A set of class objects is used, all derived from a common base class corresponding to the above described VGA-generic technique.

The first mechanism is an implementation of the VGA-generic technique. Using this mechanism, no information specific to a video-card is necessary, other that insuring VGA support. Using standard application programming interface (API) routines, primary and secondary surfaces are allocated. The new display data in the CR is simply the physical address at the start of the primary surface plus the number of pixels defined by the screen size.

Allocation of the primary surface will always be based on the entire screen display. Given the linear address of the allocated primary surface, from which a physical address can be derived, it can be extrapolated that the physical address of the *location in video memory immediately adjacent to the primary surface is represented by the sum of the number of bytes of memory used to maintain the primary surface in memory plus the value of the physical address of the primary surface.

Once the physical address of the primary surface is known, the size of the primary surface as represented in video memory can be determined.

For example, the system looks in the CRs for the resolution of the screen, 800 by 600, in terms of number of bits per pixel, or bytes per pixel. Then any data stored in the CR representing any horizontal synching space is added. This is the true scan line length. The scan line length is a more accurate measurement of the width in a given resolution.

Next, the physical address of the allocated secondary surface is derived from its linear address. In the case where the allocated secondary surface is, in fact, allocated in the memory space contiguous to the primary surface (the value of the secondary surface physical address is equal to the value of the primary surface physical address plus the size of the primary), the secondary surface is determined to be the location in memory for the overscan display.

If, however, the above is not true and the secondary surface is not contiguous to the primary surface, another approach mechanism is required.

To summarize, the first mechanism determines what the physical area for the desktop is going to be and then adds a secondary space below that to display in the overscan area. The newly allocated area will be the very first block of memory available. If this block immediately follows the primary surface, the physical address will correspond to the value associated with the physical address of the primary surface, plus the size of the primary surface. If that is true, the memory blocks are contiguous, this VGA-generic mechanism can be used.

If this first, VGA-generic mechanism cannot be used, the video card and driver name and version information retrieved from the hardware registry and BIOS, as described earlier, is used in conjunction with a look-up table to determine the best alternatives among the remaining mechanisms. The table includes a set of standards keyed to the list of driver names found in the hardware registry. A class object specific to the video chipset is instantiated based, directly or indirectly, on the VGA-generic object.

If the hardware look up does not result in a reliable match, a reliability, or confidence, fudge factor may be used. For example, if the hardware look up determines that an XYZ-brand device of some kind is being used, but the particular XYZ device named is not found in the look up table, a generic model from that chipset manufacturer many often be usable. If no information is available, the user may get a message indicating that the hardware is not supported and that the program cannot run in the overscan area. The user may then be queried to determine if the system should be operated in the "application-toolbar" mode, which basically runs with exactly the same functionality but in a windowed environment within the desktop rather than in the overscan area outside the desktop.

The next alternative mechanism uses surface overlays. The first step to this approach is to determine if the system will support surface overlays. A call is made to the video driver to determine what features are supported and what other factors are required. If surface overlays are supported, for example, there may be a scaling factor required.

For example, a particular video card in a given machine, using 2 megabytes of video RAM, might support unscaled surface overlays at 1024×768 at 8 bits per pixel, but not at 1024×768 at 16 bits per pixel because the bandwidth of the video card or the speed of the card, coupled with the relatively small amount of video memory would not be sufficient to draw a full width overlay. It is often horizontal scaling that is at issue; preventing the driver from drawing a full width overlay. An overlay is literally an image that is drawn on top of the primary surface. It is not a secondary surface, which is described above. Literally, the system sends its signal from the video driver to the hardware such that it merges the two signals together, overlaying a second signal on top of the first.

If a system can not support unscaled overlays, perhaps because of bandwidth issues or memory issues, this mechanism is not desirable. It is not rejected, but becomes a lower priority alternative. For example, if the scaling factor is below 0.1, then the normal bar can be drawn and it will be clipped closer to the edge. If the scaling factor is more than 10%, another approach mechanism is required In the next set of alternative mechanisms, a secondary surface is allocated sufficient in size to encompass the normal desktop display area plus the overscan area to be used for display of the overscan bar or bars. Using these mechanisms, the allocated secondary surface does not have to be located contiguous in memory to the primary surface. However, these approaches use more video memory than the others.

The first step is to allocate a secondary surface sufficient in size to contain the video display (the primary surface) plus the overscan area to be used. If the allocation fails, that means that there is not enough video memory to accomplish the task and this set of mechanisms is skipped and the next alternative tried. After the new block of memory is allocated, a timer of very small granularity is used to execute a simple memory copy of in the contents of the primary surface onto the appropriate location of this secondary surface. The timer executes the copy at approximately 85 times per second.

Within this set of alternative mechanisms is a variant that uses the system page tables. This mechanism queries the system page tables to determine the current GDI surface address, that is, the physical address in the page table for the primary surface. A secondary surface is then created large enough to hold all of what is in the video memory plus the memory required for the overscan bar to be displayed. This surface address is then pushed into the system page table and asserted as the GDI surface address.

Thereafter, when GDI reads from or writes to the primary surface through the driver, it actually reads from or writes the new, larger surface. The overscan bar program can, subsequently, modify the area of the surface not addressed by GDI. The original primary surface can be de-allocated and the memory usage reclaimed. This mechanism, being more memory-efficient than the previously described mechanism, is the preferred alternative. But the page tables solution will not work correctly on a chipset that includes a coprocessor device. If the initial device query reveals that the device does include a coprocessor, this variant mechanism will not be attempted.

Other variations of the above-described mechanisms are accounted for in derived class objects. For example, the VGA-generic mechanisms may vary when the video card requires more than ten bits to represent the video resolution in the CR. Some instances may require 11 bits. Such registers typically do not use contiguous bytes, but use extension bits to designate the address information for the higher order bits.

In this example, the eleventh bit is usually specified in an extended CR register and the extended CR registers are usually chip specific.

Similarly, a variation of the surface overlay mechanism includes a scaling factor, as described above. This alternative is handled in specific implementations through derived class objects and may be the best solution in certain situations.

Figure 14:
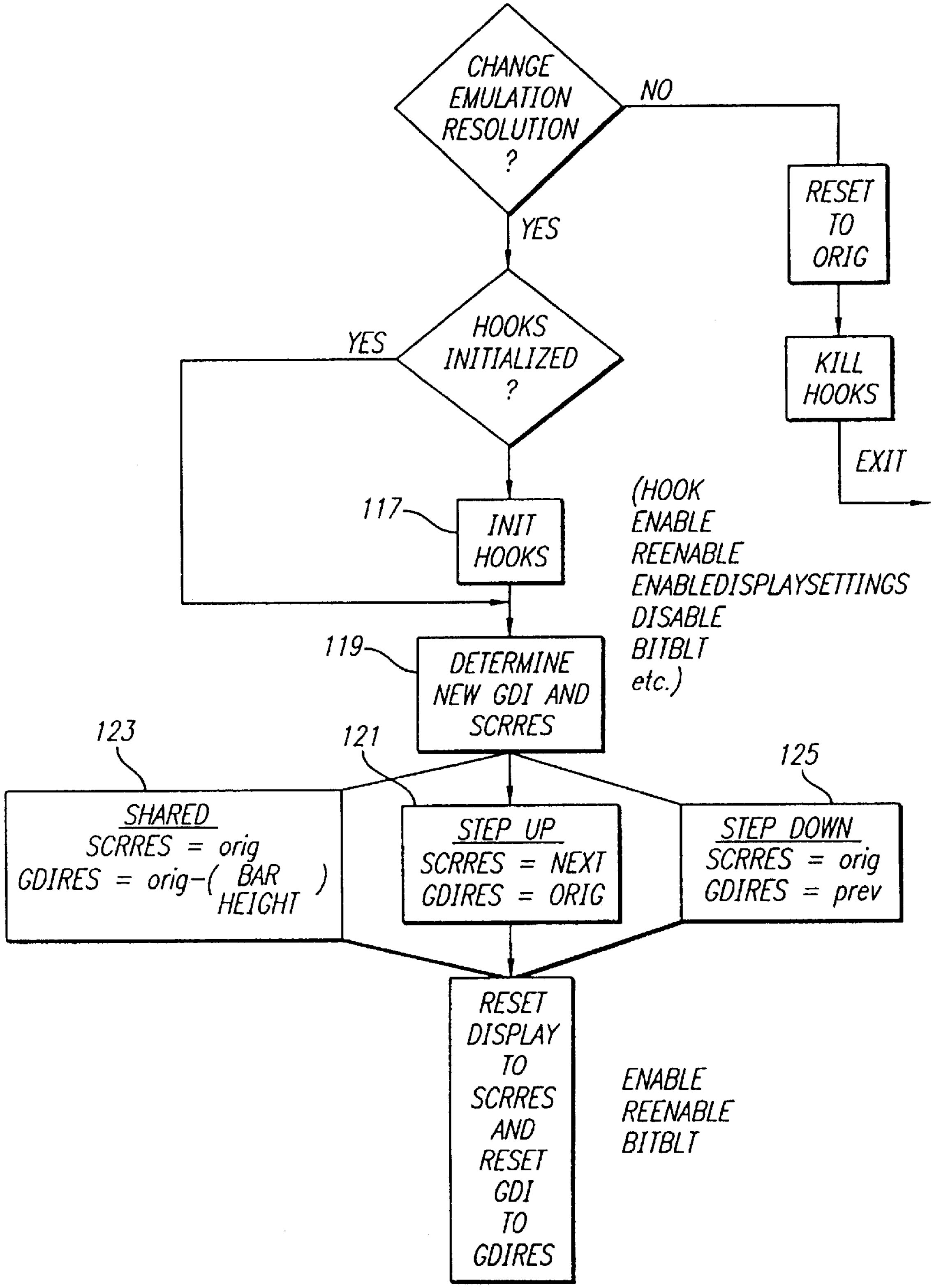
FIG. 14 is a flowchart of the sub-steps of the Change Emulation Resolution step 115 in FIG. 7.

Another implementation of this technology uses a "hooking" mechanism as shown in FIG. 14. After the display driver is identified through the hardware registry or the BIOS, as described above, certain programming interface entry points into the driver are hooked such as at step 117.

In other words, when the video system device interface, Windows GDI for example, calls those entry points into the display driver, the program can take the opportunity to modify the parameters being passed to the display driver, and/or to modify the values being returned from the display driver.

By hooking the "ReEnable" function in the display driver, at step 117, the overscan bar program can allocate screen area in different ways in step 119:

(1) In step-up mode, step 121, by intercepting a resolution change request and identifying the next-higher supported screen resolution and passing that higher resolution to the display driver, then, when the display driver acknowledges the change, intercepting the returned value, which would reflect the new resolution, and actually returning the original requested resolution instead. For example, GDI requests a change from 640×480 resolution to 800×600 resolution; the overscan program intercepts the request and modifies it to change the display driver to the next supported resolution higher than 800×600, say 1024×768. The display driver will change the screen resolution to 1024×768 and return that new resolution. The overscan program intercepts the return and instead passes the original request, 800×600, to GDI. The display driver has allocated and displays a 1024×768 area of memory. GDI and Windows will display the desktop in an 800×600 area of that display, leaving areas on the right and bottom edges of the screen available to the overscan program.

(2) In shared mode, step 123, by intercepting only the return from the display driver and modifying the value to change the operating system's understanding of the actual screen resolution. For example, GDI requests a change from 800×600 resolution to 1024×768 resolution. The overscan program intercepts the returned acknowledgment, subtracting 32 before passing the return on to GDI. The display driver has allocated and displays a 1024×768 area of memory. GDI and Windows will display the desktop in an 1024×736 area of that display, leaving an area on the bottom edge of the screen available to the overscan bar program.

After hooking, the overscan bar program can display by:

(1) using standard API calls to render the bar to an off-screen buffer, as described in the next section, and then hooking the "BitBlt" function entry point into the display driver in order to modify the offset and size parameters and subsequently redirect the BitBlt to the area outside of that which the API believes is onscreen.

(2) using mechanisms of primary and secondary surface addresses, described earlier, the program determines the linear addresses for the off-desktop memory location(s) left available to it, and can render directly to those memory locations.

Figure 10:
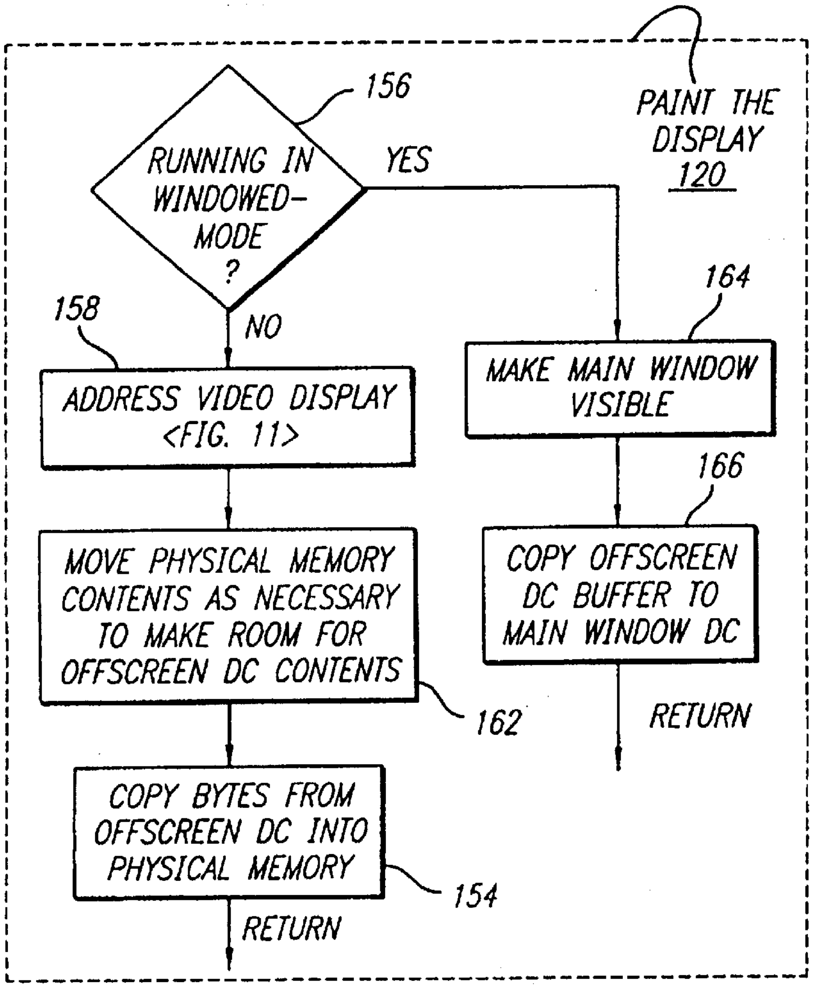
FIG. 10 is a flowchart of the sub-steps in the Paint the Display step 120 of FIG. 7.
Figure 11:
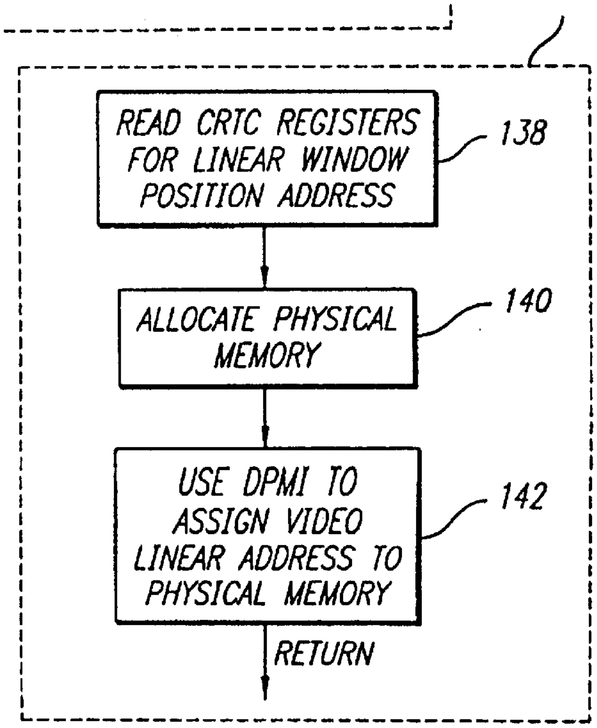
FIG. 11 is a flowchart of the sub-steps of Enable Linear Addressing step 112 of FIG. 7.
Figure 12:
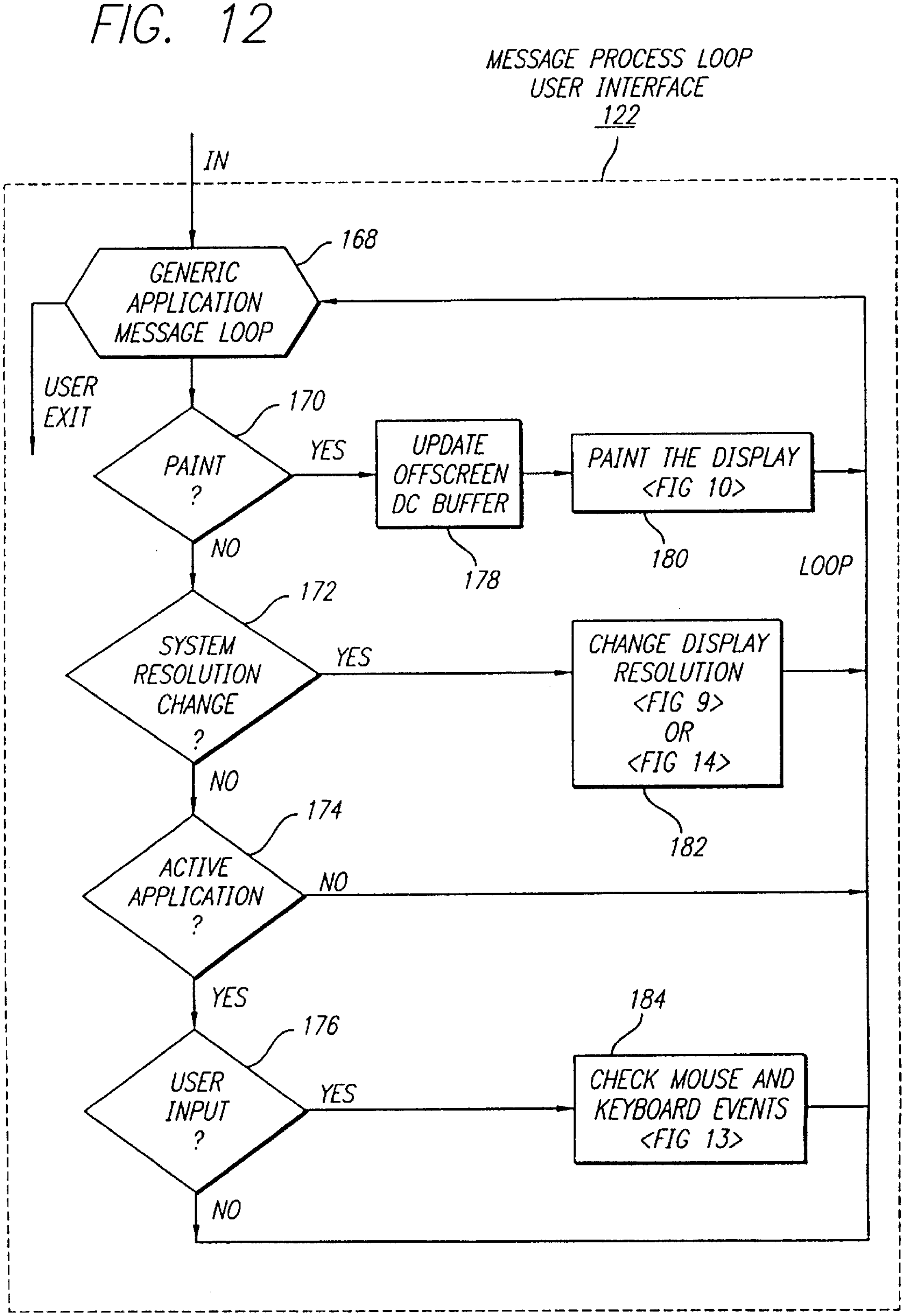
FIG. 12 is a flowchart of the sub-steps of the Process Message Loop of FIG. 7.

Phase 2 of the invention begins by painting the new images into a standard off-screen buffer, step 118, as is commonly used in the art, and making the contents visible, step 120, as described in FIG. 10. If the program is in "toolbar" mode, step 156, the off-screen buffer is painted into the standard window client space, step 166, and made visible, step 164, using generic windowing-system routines. Otherwise, the linear window position address is mapped, step 158, as described in FIG. 11 which has been previously explained. Once the linear memory is mapped to a physical memory address, step 142, the contents of the off-screen display buffer can be copied into the video buffer directly, step 154 of FIG. 10, or painted as to a secondary surface.

The preferred embodiment application includes a standard application message loop, step 122, which processes system and user events. An example of a minimum functionality process loop is in FIG. 12. Here the application handles a minimal set of system events, such as painting requests, step 170, system resolution changes, step 172, and activation/deactivation, step 174. Here, too, is where user events, such as key or mouse events, may be handled, step 184, detailed in FIG. 13. System paint messages are handled by painting as appropriate into the off-screen buffer, step 178, and painting the window or display buffer, step 180, as appropriate, as described earlier in FIG. 10. System resolution messages are received whenever the system or user changes the screen or color resolution. The programs reset all registers to the correct new values, then change the display resolution, step 182, as earlier described in FIG. 9, to reflect the new resolution modified. User messages are ignored when the program is not the active application.

Figure 13:
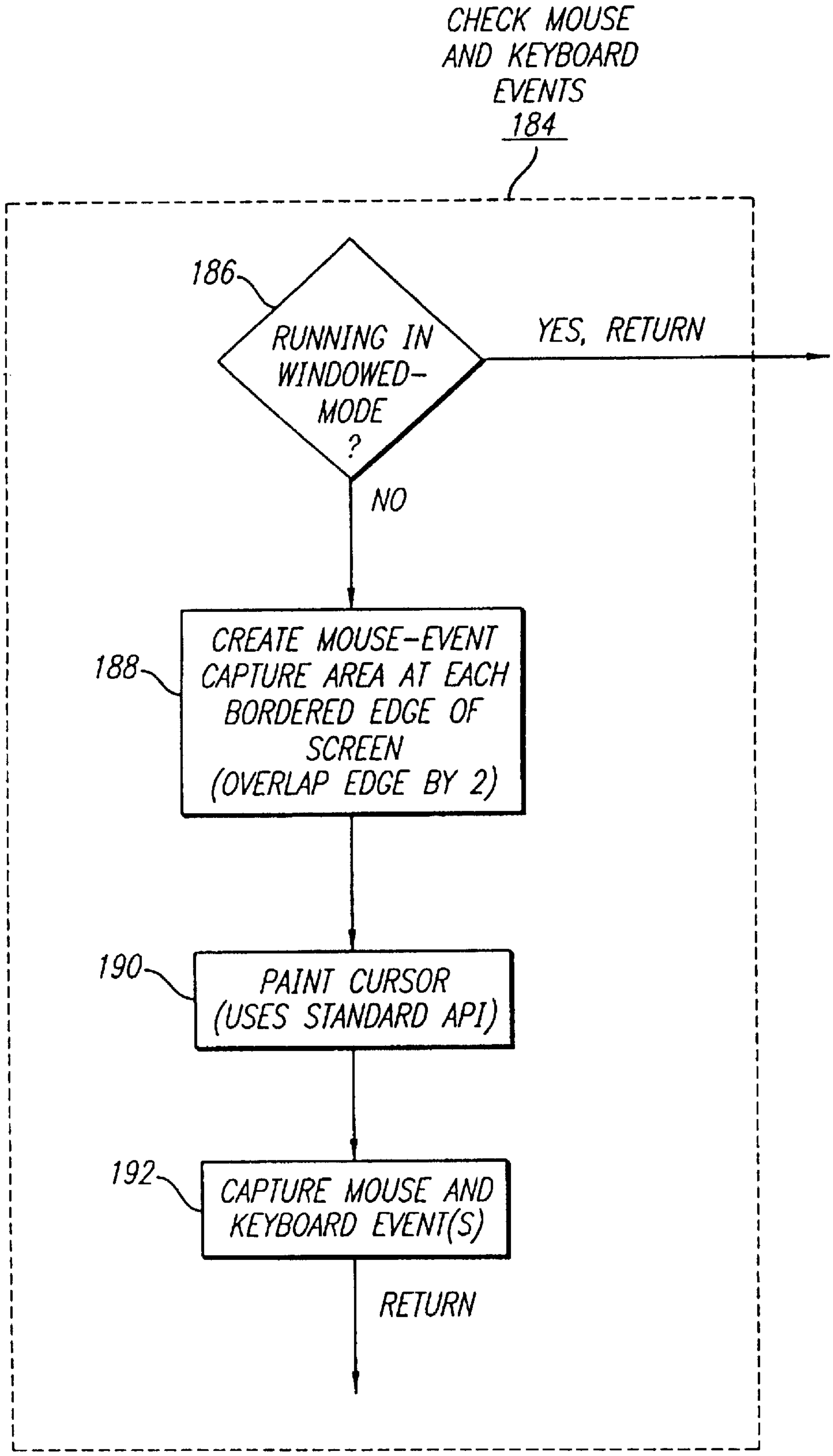
FIG. 13 is a flowchart of the sub-steps of the Check Mouse and Keyboard Events step 184 in FIG. 12.

FIG. 13 describes a method of implementing user-input events. In this embodiment, there are three alternative mechanisms used to implement cursor or mouse support so that the user has a pointing device input tool within the overscan area user interface.

In the preferred mechanism, GDI's "cliprect" is modified to encompass the overscan bar's display area. That keeps the operating system from clipping the cursor as it moves into the overscan area. This change doesn't necessarily make the cursor visible or provide event feedback to the application, but is the first step.

Some current Windows applications continually reset the cliprect. It is a standard programming procedure to reset the cliprect after use or loss of input focus. Some applications use the cliprect to constrain the mouse to a specific area as may be required by the active application. Whenever the overscan display bar interface receives the input focus it reasserts the cliprect, making it large enough for the mouse to travel down into the overscan space.

Once the cliprect has been expanded, the mouse can generate messages to the operating system reflecting motion within the expansion area. GDI does not draw the cursor outside what it understands to be its resolution, however, and does not pass "out-of-bounds" event messages on to an application. The overscan program use a VxD device driver, and related callback function, to make hardware driver calls at ring zero to monitor the actual physical deltas, or changes, in the mouse position and state. Every mouse position or state change is returned as an event to the program which can graphically represent the position within the menu display bar.

An alternative mechanism avoids the need to expand the cliprect in order to avoid conflict with a class of device drivers that use the cliprect to facilitate virtual display panning. Querying the mouse input device directly the overscan program can determine "delta's", changes in position and state. Whenever the cursor touches the very last row or column of pixels on the standard display, it is constrained there by setting the cliprect to a rectangle comprised of only that last row or column. A "virtual" cursor position is derived from the deltas available from the input device. The actual cursor is hidden and a virtual cursor representation is explicitly displayed at the virtual coordinates to provide accurate feedback to the user. If the virtual coordinates move back onto the desktop from the overscan area, the cliprect is cleared, the virtual representation removed, and the actual cursor restored onto the screen.

A third alternative mechanism creates a transparent window that overlaps the actual Windows desktop display area by a predefined number of pixels, for example, two or four pixels. If the mouse enters that small, transparent area, the program hides the cursor. A cursor image is then displayed within the overscan bar area, at the same X-coordinate but at a Y-coordinate correspondingly offset into the overscan area. If a two-pixel overlap area is used, this method uses a granularity of two. Accordingly, this API-only approach provides only limited vertical granularity. This alternative mechanism assures that all implementations will have some degree of mouse-input support, even when cliprect and input device driver solutions fail.

FIG. 7 describes the cleanup mechanisms executed when the program is closed, step 124. The display is reset to the original resolution, step 126, and the CR registers are reset to their original values, step 128, and locked, step 130.

Alternative Embodiments

Figure 5:
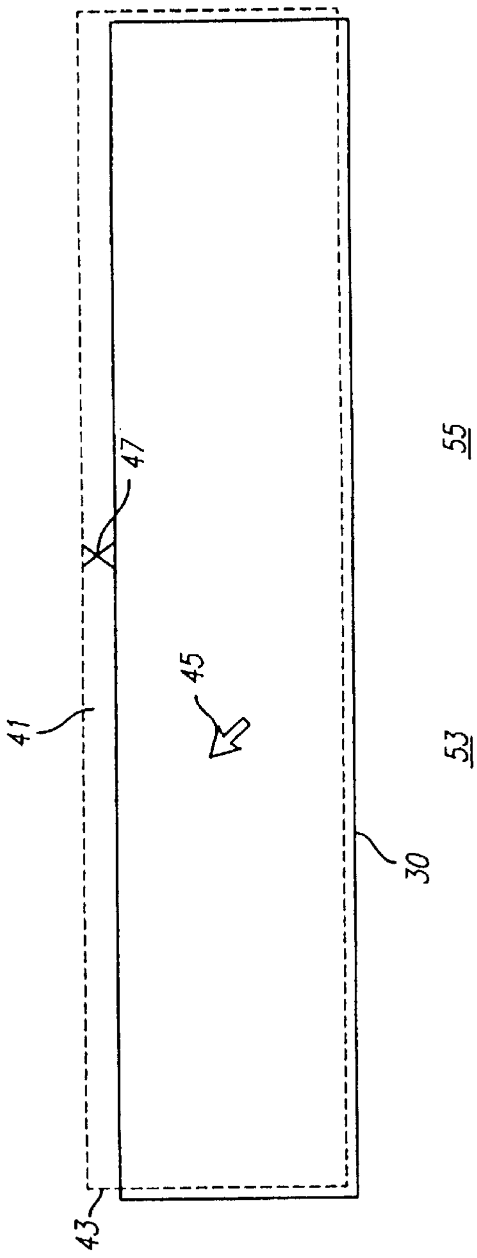
FIG. 5 shows a cursor or pointer within the overscan user interface and the hotspot above it within the standard display.

1. Utilizing the VESA BIOS Extensions (VBE) in place of the CRT Controller registers (FIG. 5) to determine the linear window position address, step 138, as necessary.
2. Utilizing API's (application programming interfaces) 62 capable of direct driver and/or hardware manipulation, such as Microsoft's DirectX and/or DirectDraw, in place of the CRT Controller registers and/or direct access to the display buffer.
3. Utilizing API's (applications programming interfaces) 62, such as Microsoft's DirectX and/or DirectDraw, capable of direct driver and/or hardware manipulation, to create a second virtual display surface on the primary display with the same purpose, to display a separate and unobscured graphical user interface.
4. Utilizing modifications in the video subsystem of the operating system 63 in place of the CRT Controller registers and/or DirectX access to the display buffer.
5. Utilizing modifications in the video subsystem of the operating system 63 to create a second virtual display surface on the primary display with the same purpose, to display a separate and unobscured graphical user interface.
6. Building this functionality into the actual video drivers 64 and/or mini-drivers. Microsoft Windows provides support for virtual device drivers, VxDs, which could also directly interface with the hardware and drivers. These could also include an API to provide applications with an interface to the modified display.
7. Incorporating the same functionality, with or without the VGA registers, into the BIOS and providing an API to allow applications an interface to the modified display.
8. Incorporating the same functionality into hardware devices, such as monitor itself, with hardware and/or software interfaces to the CPU.

In overview, the visual display area is conventionally defined by the values maintained in the CRTC registers on the chip and available to the driver. The normally displayed area is defined by VGA standards, and subsequently by SVGA standards, to be a preset number of modes, each mode including a particular display resolution which specifies the area of the display in which the desktop can be displayed.

The desktop can only be displayed in this area because Windows does not directly read/write the video memory, rather it uses programming interface calls to the video driver. And the video driver simply reads/writes using an address that happens to be in video memory. So the value this mechanism needs to realize is what the video card and driver assert are available for painting. This value is queried from the registers, modified by specific amounts and rewritten to the card. Subsequently, the present invention changes the area of writable visible display space without informing the operating system's display interface of the change This invention doesn't necessary change the CRTCs to add just to the bottom. Preferably the top is also moved up a little. This keeps the display centered within the overscan area. For example, rather than just add thirty-two scan lines to the bottom, the top of the display area is moved up by sixteen lines.

Nor does this invention depend solely upon the ability to change the CRTCs to modify the visible display area. Alternative mechanisms define other methods of creating and accessing visible areas of the screen that are outside the dimensions of the desktop accessed by the operating system's display interface.

From a consideration of the specifications, drawings, and claims, other embodiments and variations of the invention will be apparent to one skilled in the art of computer science.

In particular, the secondary GUI may be positioned in areas not normally considered the conventional overscan area. For example, the secondary GUI may be positioned in a small square exactly in the center of the normal display in order to provide a service required by the particular system and application. In fact, the techniques of reading and rewriting screen display information can be used within the scope of the invention to maintain the primary GUI information, or portions of it, in an additional memory and selectively on a timed or other basis, replace a portion of the primary GUI with the secondary GUI.

As a simple example, a security system may require the ability to display information to a user without regard to the status of the computer system and/or require the user to make a selection, such as call for help by clicking on "911?". The present invention could provide a video display buffer in which a portion of the primary GUI interface was continuously recorded and displayed in a secondary GUI for example in the center of the screen. Under non-emergency conditions, the secondary GUI would then be effectively invisible in that the User would not notice anything except the primary GUI.

Under the appropriate emergency conditions, an alarm monitor could cause the secondary GUI to present the "911?" to the user by overwriting the copy of the primary display stored in the secondary GUI memory. Alternatively, a database of photographs may be stored and one recalled in response to an incoming phone call in which caller ID identified a phone number associated with a database photo entry.

In general, the present invention may provide one or more secondary user interfaces which may be useful whenever it is more convenient or desirable to control a portion of the total display, either outside the primary display in an unused area such as overscan or even in a portion of the primary GUI directly or by time division multiplexing, directly by communication with the video memory are by bypassing at least a portion of the video memory to create a new video memory. In other words, the present invention may provide one or more secondary user interfaces outside of the control of the system, such as the operating system, which controls the primary GUI.

Additional user interfaces may be used for a variety of different purposes. For example, a secondary user interface may be used to provide simultaneous access to the Internet, full motion video, and a conference channel. A secondary user interface may be dedicated to a local network or multiple secondary user interfaces may provide simultaneous access and data for one or more networks to which a particular computer may be connected.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims.

We claim:

1. A method for displaying data on a video display system in conjunction with a user interface that occupies at least a portion of a first display area, the fist display area being accessible by a computer operating system, the video display system having a total displayable area of which the first display area is a part, comprising:

modifying the total displayable area of the video display system by adjusting the parameters of the video display system to include a second display area that is inaccessible by the computer operating system;

allocating the modified displayable area between the first display area and the second display area;

writing the data to the second display area in accordance with the allocation of the modified displayable area so that the data is displayed on the video display system in conjunction with the user interface.

2. The method of claim 1 wherein the allocating of the modified displayable area decreases the size of the portion of the displayable area that is accessible by the operating system relative to the size of the total displayable area.

3. The method of claim 2 wherein the modified displayable area is larger than before modification.

4. The method of claim 1 wherein the modified displayable area is larger than before modification and the allocating of the modified displayable area increases the size of the first display area that is accessable by the operating system.

5. The method of claim 4 wherein the increased size of the first display area accessible by the opening system is not a standard video resolution mode size.

6. The method of claim 1 wherein the modifying of displayable area further comprises adjusting the parameters of the video display system to increase the number of displayable pixels in at least one dimension of the displayable area to less than or equal to the maximum number of pixels that can be effectively displayed by the video display system.

7. The method of claim 6 wherein the adjusting the parameters of the video display system is performed using techniques that address pixels in an overscan area of the video display system.

8. The method of claim 7 wherein the data is displayed in at least a portion of pixels in the overscan area and includes a movable pointer that moves in relation to user input.

9. The method of claim 8 wherein the pointer has an associated tip that is positioned outside of a cursor activation point associated with the tip, the cursor activation point remaining within the first display area while the pointer is displayed within the image.

10. The method of claim 6 wherein the adjusted parameters are control parameters for a controller of a cathode ray tube display.

11. The method of claim 1 wherein the modified displayable area is enlarged to include a second display area by increasing the number of displayable pixels in at least one dimension of the displayable area.

12. The method of claim 11 wherein the dimension in which the number of displayable pixels is increased is vertical and the data is displayed below the user interface.

13. The method of claim 11 wherein the dimension in which the number of displayable pixels is increased is vertical and the data is displayed above the user interface.

14. The method of claim 11 wherein the dimension in which the number of displayable pixels is increased is horizontal and the data is displayed to the left of the user interface.

15. The method of claim 11 wherein the dimension in which the number of displayable pixels is increased is horizontal and the data is displayed to the right of the user interface.

16. The method of claim 11 wherein the dimension in which the number of displayable pixels is increased is both horizontal and vertical and the data is displayed on a vertical side of the user interface and on a horizontal side of the user interface.

17. The method of claim 1 wherein the modifying of the total displayable area by adjusting the parameters of the video display system to include the second display area increases the displayable area to a standard resolution supported by the video display system.

18. The method of claim 1 wherein the adjusting of the parameters and the allocating of the modified displayable area further comprises:

intercepting a request from the operating system to use a first higher video resolution mode;

requesting the video display system to use a second higher video resolution mode that is higher than the first higher video resolution mode;

allocating to the first display area the portion of the displayable area that corresponds to the first higher video resolution mode; and allocating to the second display area for displaying the data the increased displayable area between the first higher video resolution mode and the second higher video resolution mode.

19. The method of claim 1 wherein the adjusting of the parameters and the allocating of the modified displayable area further comprises:

intercepting a request from the operating system to use a higher video resolution mode that is higher than a current resolution mode;

allocating to the first display area the displayable area that corresponds to the current resolution mode; and allocating to the second display area for displaying the data the increased displayable area between the higher video resolution mode and the current video resolution mode.

20. The method of claim 1 wherein the adjusting of the parameters and the allocating of the modified displayable area further comprises:

intercepting a request from the operating system to use a first higher video resolution mode;

requesting the video display system to use the first higher video resolution mode, thereby resulting in an increased total displayable area;

allocating to the first display area a portion of the increased displayable area; and allocating to the second display area for displaying the data the remaining portion of the increased displayable area.

21. The method of claim 1 wherein at least a portion of the data is displayed along with the user interface in a manner that prohibits the operating system from overwriting the portion of the data.

22. A display controller for enabling the display of a secondary user interface on a video display system in conjunction with a primary user interface presented by a separately controlled program on a first display area of the video display system, the video display system having a total displayable area, comprising:

display adjustment facility that modifies the total displayable area of the video display system by adjusting the parameters of the video display system to include a second display area that is inaccessible to the separately controlled program;

display allocation facility that allocates the modified displayable area between the first display area and the second display area; and display transfer mechanism that writes the secondary user interface to the second display area in accordance with the allocation of the modified displayable area so that the secondary user interface is displayed in conjunction with the primary user interface.

23. The system of claim 22 wherein the display allocation facility decreases the size of the portion of the displayable area that is accessible to the separately controlled program relative to the size of the total displayable area.

24. The system of claim 23 wherein the display adjustment facility enlarges the total displayable area.

25. The system of claim 22 wherein the display adjustment facility enlarges the total displayable area and the display allocation facility increases the size of the display area that is accessible to the separately controlled program.

26. The system of claim 25 wherein the increased size of the display area allocated to the first display area is not a standard video resolution mode size.

27. The system of claim 22 wherein the display adjustment facility modifies the displayable area by adjusting the parameters of the video display system to increase the number of displayable pixels in at least one dimension of the displayable area to less than or equal to the maximum number of pixels that can be effectively displayed by the video display system.

28. The system of claim 27 wherein the display adjustment facility adjusts the parameters of the video display system using techniques that address pixels in an overscan area of the video display system.

29. The system of claim 28 wherein the display transfer mechanism displays the secondary user interface in at least a portion of pixels in the overscan area with a movable pointer that moves in relation to user input.

30. The system of claim 29 wherein the movable pointer has an associated tip that is positioned outside of a cursor activation point associated with the tip, the cursor activation point remaining within the first display area while the pointer is displayed within the secondary user interface.

31. The system of claim 27 wherein the parameters adjusted by display adjustment facility are control parameters for a controller of a cathode ray tube display.

32. The system of claim 22 wherein the display adjustment facility enlarges the total displayable area to include a second display area by increasing the number of displayable pixels in at least one dimension of the displayable area.

33. The system of claim 32 wherein the dimension in which the number of displayable pixels is increased is vertical and the secondary user interface is displayed below the primary user interface.

34. The system of claim 32 wherein the dimension in which the number of displayable pixels is increased is vertical and the secondary user interface is displayed above the primary user interface.

35. The system of claim 32 wherein the dimension in which the number of displayable pixels is increased is horizontal and the secondary user interface is displayed to the left of the primary user interface.

36. The system of claim 32 wherein the dimension in which the number of displayable pixels is increased is horizontal and the secondary user interface is displayed to the right of the primary user interface.

37. The system of claim 32 wherein the dimension in which the number of displayable pixels is increased is both horizontal and vertical and the secondary user interface is displayed on a vertical side of the primary user interface and on a horizontal side of the primary user interface.

38. The system of claim 22 wherein the display adjustment facility modifies the total displayable area to include the second display area by adjusting the parameters to increase the displayable area to a standard resolution supported by the video display system.

39. The system of claim 22 wherein the display adjustment facility and display allocation facility further comprise hooking mechanism that intercepts a request form the separately controlled program to use a first higher video resolution mode;

requests the video display system to use a second higher video resolution mode that is higher than the first higher video resolution mode;

allocates to the first display area the portion of the displayable area that corresponds to the first higher video resolution mode; and allocates to the second display area the increased displayable area between the first higher video resolution mode and the second higher video resolution mode.

40. The system of claim 22 wherein the display adjustment facility and display allocation facility further comprise hooking mechanism that intercepts a request from the separately controlled program to use a higher video resolution mode that is higher than a current resolution mode;

allocates to the first display area the displayable area that corresponds to the current resolution mode; and allocates to the second display area the increased displayable area between the higher video resolution mode and the current video resolution mode.

41. The system of claim 22 wherein the display adjustment facility and display allocation facility further comprise hooking mechanism that intercepts a request form the separately controlled program to use a first higher video resolution mode;

requests the video display system to use the first higher video resolution mode, thereby increasing the total displayable area;

allocates to the first display area a portion of the increased displayable area; and allocates to the second display area the remaining portion of the increased displayable area.

42. The system of claim 22 wherein the display transfer mechanism displays at least a portion of the secondary user interface along with the primary user interface in a manner that prohibits the primary user interface from overwriting the portion of the secondary user interface.

43. The system of claim 22, wherein the display adjustment facility adjusts the parameters of the video display system by performing function calls to driver software of the video display system.

44. A computer readable memory medium containing instructions for controlling a computer processor to display a secondary user interface on a video display system in conjunction with the display of a primary user interface of a separately controlled program presented on a first display of the video display system, the video display system having a total displayable area, by:

modifying the total displayable area of the video display system by adjusting the parameters of the video display system to include a second display area;

allocating the modified displayable area between the first display area and the second display area;

writing the secondary use interface to the second display area in accordance with the allocation of the modified displayable area so that the secondary user interface is displayed in conjunction with the primary user interface and is inaccessible to the separately controlled program.

45. The computer readable memory medium of claim 44 wherein the allocating of the modified displayable area decreases the size of the portion of the displayable area that is allocated to the first display area relative to the size of the total displayable area.

46. The computer readable memory medium of claim 45 wherein the modified displayable area is enlarged.

47. The computer readable memory medium of claim 44 wherein the modified displayable area is larger than before modification and the allocating of the modified displayable area increases the size of the first display area.

48. The computer readable memory medium of claim 47 wherein the increased size of the first display area is not a standard video resolution mode size.

49. The computer readable memory medium of claim 44 wherein the modifying of displayable area further comprises adjusting the parameters of the video display system to increase the number of displayable pixels in at least one dimension of the displayable area to less than or equal to the maximum number of pixels that can be effectively displayed by the video display system.

50. The computer readable memory medium of claim 49 wherein the adjusting the parameters of the video display system is performed using techniques that address pixels in an overscan area of the video display system.

51. The computer readable memory medium of claim 44 wherein the secondary user interface is displayed in at least a portion of pixels in the overscan area and includes a movable pointer that moves in relation to user input.

52. The computer readable memory medium of claim 51 wherein the pointer has an associated tip that is positioned outside of a cursor activation point associated with the tip, the cursor activation point remaining within the display area controlled by the primary user interface while the pointer is displayed within the secondary user interface.

53. The computer readable memory medium of claim 44 wherein the modifying of the total displayable area of the video display system by adjusting the parameters to include the second display area increases the displayable area to a standard resolution supported by the video display system.

54. The computer readable memory medium of claim 44 wherein the adjusting of the parameters and the allocating of the modified displayable area is performed by:

intercepting a request from the primary user interface;

requesting the video display system to use different video resolution mode, thereby modifying the size of the displayable area; and allocating the modified display area between the primary user interface and the secondary user interface.

55. The computer readable memory medium of claim 44 wherein at least a portion of the secondary user interface is displayed along with the primary user interface in a manner that prohibits the primary user interface from overwriting the portion of the secondary user interface.

* * * * *

UNITED STATES PATENT AND TRADEMARK OFFICE
CERTIFICATE OF CORRECTION

PATENT NO. : 6,330,010 B1 
DATED : December 11, 2001
INVENTOR(S) : David D. Nason et al.

It is certified that error appears in the above-identified patent and that said Letters Patent is hereby corrected as shown below:

Title page,
Item [75], Inventors, "David D Nason; Thomas C O'Rourke; Scott J Campbell" should be corrected to read -- David D. Nason; Thomas C. O'Rourke; Scott J. Campbell --.

Item [56], References Cited, should include the following references:

| | | | | |
|---|---|---|---|---|
| -- 6,025,884 | 02/15/00 | Choi | 348 | 565 |
| 6,094,230 | 07/25/00 | Han | 348 | 564 |
| 6,172,699 | 01/09/01 | Murphy et al. | 345 | 199 --. |

Column 17,
Line 7, "area, the fist display area" should read -- area, the first display area --.
Line 29, "that is accessable by the" should be corrected to read -- that is accessible by the --.
Line 31, "by the opening system" should be corrected to read -- by the operating system --.

Column 20,
Line 14, "intercepts a request form the" should be corrected to read -- intercepts a request from the --.
Line 40, "intercepts a request form the" should be corrected to read -- intercepts a request from the --.

Column 21,
Line 3, "writing the secondary use" should be corrected to read -- writing the secondary user --.

Signed and Sealed this

Twenty-fourth Day of September, 2002

*Attest:*

JAMES E. ROGAN

*Attesting Officer* — *Director of the United States Patent and Trademark Office*